(12) United States Patent
Sato

(10) Patent No.: US 7,346,466 B2
(45) Date of Patent: Mar. 18, 2008

(54) GEOMAGNETIC SENSOR AND GEOMAGNETIC SENSOR CORRECTION METHOD, TEMPERATURE SENSOR AND TEMPERATURE SENSOR CORRECTION METHOD, GEOMAGNETISM DETECTION DEVICE

(75) Inventor: Hideki Sato, Hamamatsu (JP)

(73) Assignee: Yamaha Corporation (JP)

( * ) Notice: Subject to any disclaimer, the term of this patent is extended or adjusted under 35 U.S.C. 154(b) by 0 days.

(21) Appl. No.: 11/698,156

(22) Filed: Jan. 26, 2007

(65) Prior Publication Data

US 2007/0124096 A1  May 31, 2007

Related U.S. Application Data

(63) Continuation of application No. 11/345,279, filed on Feb. 2, 2006.

(30) Foreign Application Priority Data

Mar. 30, 2005  (JP) .............................. 2005-099092

(51) Int. Cl.
*G01C 19/00* (2006.01)
*G01C 17/38* (2006.01)
*G01R 33/00* (2006.01)

(52) U.S. Cl. ................... 702/104; 33/356; 324/260

(58) Field of Classification Search ............... 702/104, 702/90, 92, 94–95, 107, 150–153, 182, 189, 702/191, 196; 324/200, 202, 244, 260; 73/1.41; 33/355 R, 356

See application file for complete search history.

(56) References Cited

U.S. PATENT DOCUMENTS 4,414,753 A * 11/1983 Moulin et al. ............... 33/356
4,720,992 A    1/1988 Hormel
4,739,560 A    4/1988 Akutsu et al.
4,807,462 A    2/1989 Al-Attar
5,345,382 A    9/1994 Kao
5,349,529 A *  9/1994 Masumoto et al. ........... 702/85
5,349,530 A *  9/1994 Odagawa .................... 701/214
5,394,029 A    2/1995 Gay et al.

(Continued)

FOREIGN PATENT DOCUMENTS

GB   2 358 515 A   7/2001

(Continued)

OTHER PUBLICATIONS

International Search Report (Form PCT/ISA/210) for International Application No. PCT/JP2005/018638, date of mailing Jan. 17, 2006.

(Continued)

*Primary Examiner*—John Barlow
*Assistant Examiner*—Toan M. Le
(74) *Attorney, Agent, or Firm*—Dickstein, Shapiro, LLP.

(57) ABSTRACT

A magnetism detection device includes a geomagnetism detection element for detecting geomagnetism of each transverse axial component and a nonvolatile memory element of a thermal metamorphic type for storing one piece or a plurality of pieces of correction data for correcting the detected geomagnetism values. Each piece of correction data is expressed as a value of a ration of inter-axial correction coefficient to the axial sensitivity correction coefficient of either axis.

18 Claims, 15 Drawing Sheets

U.S. PATENT DOCUMENTS

| | | |
|---|---|---|
| 5,564,194 A | 10/1996 | Fujita et al. |
| 5,701,259 A * | 12/1997 | Dittrich ................ 702/92 |
| 5,982,176 A | 11/1999 | Kawamura et al. |
| 6,009,629 A | 1/2000 | Gnepf et al. |
| 6,046,492 A | 4/2000 | Machida et al. |
| 6,049,761 A | 4/2000 | Hoshino et al. |
| 6,249,246 B1 | 6/2001 | Bode et al. |
| 6,468,825 B1 | 10/2002 | Machida et al. |
| 6,707,298 B2 | 3/2004 | Suzuki et al. |
| 6,786,877 B2 | 9/2004 | Foxlin |
| 6,842,991 B2 * | 1/2005 | Levi et al. ................ 33/356 |
| 6,888,397 B2 | 5/2005 | Tsuchiya |
| 6,922,647 B2 | 7/2005 | Cho et al. |
| 6,999,339 B2 | 2/2006 | Tuttle et al. |
| 7,053,607 B2 | 5/2006 | Sato et al. |
| 7,162,807 B2 * | 1/2007 | Choi et al. ................ 33/356 |
| 2003/0013507 A1 | 1/2003 | Sato |

FOREIGN PATENT DOCUMENTS

| | | |
|---|---|---|
| JP | 4-84711 A | 3/1992 |
| JP | 10-122976 A | 5/1998 |
| JP | 2000-180170 | 6/2000 |
| JP | 2003-294447 A | 10/2003 |
| JP | 2004-85384 | 3/2004 |

OTHER PUBLICATIONS

Written Opinion of the International Searching Authority for International Application No. PCT/JP2005/018638, date of mailing Jan. 17, 2006.

* cited by examiner

GEOMAGNETIC SENSOR AND GEOMAGNETIC SENSOR CORRECTION METHOD, TEMPERATURE SENSOR AND TEMPERATURE SENSOR CORRECTION METHOD, GEOMAGNETISM DETECTION DEVICE

CROSS-REFERENCE TO RELATED APPLICATIONS

This application is continuation of U.S. patent application Ser. No. 11/345,279, filed Feb. 2, 2006, which is a continuation of International Application PCT/JP2005/018638, with an international filing date of Oct. 7, 2005, the entirety of which are incorporated herein by reference.

TECHNICAL FIELD

This invention relates to a geomagnetic sensor installed for directional measurement in, for example, a cell phone device, and to a geomagnetic sensor correction method for correcting measurement values using offset values stored in a fuse memory.

This application claims priority from Japanese Patent Application No. 2004-295139 filed on Oct. 7, 2004, Japanese Patent Application No. 2004-297981 filed on Oct. 12, 2004, and Japanese Patent Application No. 2005-99092 filed on Mar. 30, 2005, the contents of which are incorporated herein by reference.

This invention also relates to a temperature sensor used in temperature compensation of a geomagnetic sensor for directional measurement installed, for example, in a cell phone device, and to a temperature sensor correction method for correcting measurement values using initial values and correction values stored in a fuse memory.

This invention also relates to a geomagnetism detection device having a geomagnetism detection element for detecting the transverse axial components of geomagnetism, and in particular to one having a nonvolatile memory element of the thermal metamorphic type for storing correction information pertaining to the detection outputs of the geomagnetism detection element.

BACKGROUND ART

In recent years, portable information terminals such as cell phones have become known. These are provided with a geomagnetic sensor for detecting geomagnetism, and conduct directional measurement based on the geomagnetism detected by this geomagnetic sensor. The measured directions are used, for example, in the display of maps. To cite one example, cell phones are appearing that possess the function of displaying maps according to the cell phone orientation (direction) based on current positional information obtained by GPS (Global Positioning System), which conducts position detection.

Incidentally, the properties of geomagnetic sensors vary according to the chip, and these properties should be corrected by some type of means. For example, the circle drawn from the output when a cell phone incorporating a geomagnetic sensor, which possesses magnetism detection directions along two axes (X-axis and Y-axis directions) in a horizontal plane as the sensitivity directions, is slowly rotated one or more revolutions at uniform speed in a fixed magnetic field without altering the horizontal state is referred to as the azimuth circle.

This type of azimuth circle is ideally centered on the origin of the intersection of the X axis and Y axis, and possesses a specified radius. However, as mentioned above, the properties of geomagnetic sensors vary according to the chip, and a magnetic field exists inside the cell phone. Due to the existence of this variation in properties and the aforementioned magnetic field, the center of the pertinent azimuth circle shifts from the origin. This shift is referred to as the offset, and this shift value is referred to as the offset value. When this type of offset exists, the direction calculated based on the measurement value of the geomagnetic sensor on the assumption that there is no offset differs from the actual direction. Consequently, the geomagnetic sensor corrects the pertinent offset from the measurement value.

As correction of the offset from the measurement value of the geomagnetic sensor is here conducted by subtracting the offset value—obtained by digital computation from a plurality of measurement values obtained by rotating the pertinent cell phone—from the measurement value, it is necessary to store the offset value used for the pertinent correction in the geomagnetic sensor. Consequently, a conventional geomagnetic sensor is configured on one chip by combining a geomagnetic sensor element for detecting geomagnetism (magnetic field) with an arithmetic unit for calculating the offset value from the measurement value of the pertinent geomagnetic sensor element, an A/D converter for conducting A/D (analog/digital) conversion of the pertinent offset value, and an EEPROM (Electronically Erasable and Programmable Read Only Memory) for storing the offset value that has undergone A/D conversion.

However, in conventional geomagnetic sensors, the EEPROM that stores the aforementioned offset value applies a thin oxide film like a tunnel insulating film to the memory unit, and laminates the polysilicon layer and metal layer that serve to form the bit lines and word lines on the chip into several layers. Consequently, a special process is required to manufacture the pertinent chip, resulting in the problem of a high unit price for the chip. Moreover, EEPROM requires a high voltage generation circuit, a writing circuit and the like for purposes of writing, which results in the further problem that chip size is enlarged, and the geomagnetic sensor system for driving EEPROM grows larger in scale.

Conventionally, in the temperature sensor formed on the semiconductor chip, one uses, for example, the temperature sensor circuit 212 shown in FIG. 12. The temperature sensor circuit 212 is composed of the op amp OA, the diodes D1-D2, the resistors R1-R3, and the A/D (analog/digital) converter ADC. The op amp OA, diodes D1-D2 and resistors R1-R3 configure a general band gap reference circuit.

The noninvertible input terminal of the op amp is connected to the anode of the diode D1, and the cathode of the diode D1 is grounded. The invertible input terminal of the op amp OA is connected to one end of the resistor R3, the other end of the resistor R3 is connected to the anode of the diode D2, and the cathode of the diode D2 is grounded. The output terminal of the op amp OA is connected to the noninvertible input terminal via resistor R1, and connected to the invertible input terminal via resistor R2.

The output terminal OpVref for outputting the output voltage Vref of the pertinent band gap reference circuit is connected to the output terminal of the op amp OA, while the output terminal OpVbe for outputting the pertinent voltage Vbe to diode D1 is connected to the noninvertible input terminal of the op amp OA.

Output terminal OpVref of the pertinent band gap reference circuit is connected to input terminal IpVh of the A/D converter ADC, and output terminal Opbe of the pertinent band gap reference circuit is connected to input terminal IpV1 of the A/D converter ADC. The A/D converter ADC conducts A/D (analog/digital) conversion of the differential voltage V of the voltage inputted to input terminal IpVh and the voltage inputted to input terminal IpV1, and is provided with output terminal OpDout for outputting the output value Dout, which is the conversion value of the output voltage. The aforementioned A/D converter ADC sets the range of the voltage Vin at 0-1.25V, conducts A/D conversion of the pertinent voltage Vin at 1251 step (0-1250), and outputs the output value Dout.

Next, the operations of the temperature sensor circuit 212 are explained. The band gap reference circuit comprising the op amp OA, the diodes D1-D2 and the resistors R1-R3 outputs the output voltage Vref (=1.25 V), which has little source voltage and temperature dependency, from output terminal OpVref to input terminal IpVh of the A/C converter ADC, and outputs the output voltage Vbe that has a temperature coefficient of approximately −2 mV/° C. from output terminal OpVbe to input terminal lpV1 of the A/D converter ADC. The A/D converter ADC then conducts A/D conversion of the voltage Vin, which is the differential voltage of the output voltage Vref and the output voltage Vbe, at 1251 step, and outputs the output value Dout.

At this time, as the output voltage Vref has little source voltage and temperature dependency, it can be treated as a constant, and as the output voltage Vbe has a temperature coefficient of approximately −2 mV/° C., the voltage Vin varies according to temperature corresponding to the output voltage Vbe. Accordingly, the output value Dout varies according to temperature. In this context, if one assumes that the output voltage Vbe is 0.6V when the ambient temperature is 25° C., the output value Dout will be as shown in the following formula (21).

$$Dout = -2(T-25) + 600 \qquad (21)$$

According to formula (21), when ambient temperature is 30° C., the output voltage Vbe is 0.59, and the output value Dout is 590.

As literature relating to this invention, Japanese Patent Application 2004-85384, for example, records a temperature sensor circuit wherein the partial pressure ratio of the resistor group is adjusted by a fuse circuit combining the fuse and the pertinent resistor group, where the influence of manufacturing process variations can be eliminated, and high-precision temperature compensation can be conducted by means of the output voltage adjusted by the pertinent fuse circuit.

However, in the aforementioned temperature sensor circuit 212, with regard to the output voltage Vref of the internal band gap reference circuit and the pertinent voltage Vbe in diode D1, the voltage values and temperature properties have individual variations, resulting in the problem that it is difficult to improve the accuracy of the output value Dout, which is a measurement value.

In general, LSIs (large-scale integrated circuits) that mount a magnetic sensor for two transverse axial directions on the chip to conduct geomagnetism detection possess a means for correcting the sensitivity of the geomagnetic sensor.

As a technology that conducts correction of the detection output of a magnetic sensor by arithmetic processing, there is, for example, the one recorded in Japanese Patent Application 2000-180170. According to the technology recorded in this same literature, correction of the detection output of the X axis detection portion is conducted as follows. That is, the detection range of the magnetic sensor is divided into 4 blocks at 90° each, the maximum output voltage value of the X axis detection portion is A1, and the output voltage value of the X axis detection portion at the point where there has been a 90° rotation from the position where the output value of the Y axis detection portion is zero is A2.

This is classified according to cases where the output voltage value A2 is on the + side, cases where it is on the − side, and cases where it is infinitesimal. In the case of the + side, formula (301) is applied as the correction formula; in the case of the − side, formula (302) is applied as the correction formula; and in the case where infinitesimal, no correction is made.

$$[ABS(A3) + ABS(A2)] \cdot Z \qquad (301)$$

$$[ABS(A3) + ABS(A2)]/Z \qquad (302)$$

Provided that A3 is the actually measured output of the X axis detection portion, and Z is the correction parameter shown in formula (303).

$$Z = A1/[A1 - ABS(A2)] \qquad (303)$$

Correction is conducted by the same technique for the Y axis as well, and the degree of orthogonality of the X-axis detection portion and the Y-axis detection portion is corrected.

In the case where correction of the detection output of the magnetic sensor is conducted by arithmetic processing in this manner, one may, for example, adopt the mode where correction data is measured in shipment inspection, and written into a nonvolatile memory mounted in the LSI.

Incidentally, with regard to this type of LSI, one has recently become available that mounts a fuse memory for receiving requests for low voltage generation, and for enabling appropriate reading as nonvolatile memory even at low voltage.

However, in contrast to the aforementioned advantages, the fuse memory requires large capacity in the transistor for the fuse cutting that is used during writing, and it is necessary to pay attention to the scale of the circuit. Consequently, with the mode where correction data values obtained at the time of shipment inspection are written into the fuse memory without alteration, numerous fuse memories are required, which is inconvenient for purposes of circuit design.

DISCLOSURE OF THE INVENTION

The first set of inventions of this application was made in light of the aforementioned circumstances, and its purpose is to offer a more compact and inexpensive geomagnetic sensor and geomagnetic sensor correction method that bring about a smaller scale for the overall memory system without requiring special processes in chip manufacture by having a built-in fuse memory, and storing offset values and the like.

In order to achieve the aforementioned purpose, this invention proposes the following means.

The first set of inventions of this application comprises a geomagnetism detection means for detecting geomagnetism; a fuse memory, where the fuse memory possesses a plurality of memory units, where it is possible to electrically cut or connect each of the said memory units in a selective manner, and where specified data is stored in each of the said memory units according to the state of electrical cut-off or connection; a correction data writing means for inputting the measurement values of said geomagnetism detection means at the time of manufacture, for obtaining correction values that correct the temperature property of the measurement values of the geomagnetism detection means based on the aforementioned measurement values, and for writing said correction values into said fuse memory by selectively conducting electrical cut-off or connection of each of the memory units contained in said fuse memory according to said correction values; a correction data reading means for reading said correction values from said fuse memory at times of actual use after manufacture; and a correction means for inputting the measurement values of said geomagnetism detection means at said times of actual use, and for correcting the measurement values of said geomagnetism detection means based on the correction values read by said correction data reading means.

With this invention, at the time of manufacture of the geomagnetic sensor, the correction data writing means obtains correction values from the measurement values of the geomagnetism detection means that correct the pertinent measurement values, and, using a fuse memory, conducts writing while ensuring the preservability of the pertinent correction values by physically cutting the fuses corresponding to the pertinent correction values. At times of actual use of the geomagnetic sensor, the correction data reading means reads the correction values from the fuse memory, and the correction means corrects the measurement values of the geomagnetism detection means based on the pertinent correction values.

The first set of inventions of this application also comprises a geomagnetic sensor correction method for correcting the recorded measurement values of a geomagnetic sensor that is further provided with a temperature measurement means for the detection of temperature by said geomagnetic sensor, comprising: a step in which the sensitivity property of said temperature measurement means is obtained in advance, and stored in said fuse memory at the time of manufacture of said geomagnetic sensor; a step in which the sensitivity property of said temperature measurement means is corrected according to the sensitivity property data stored in said fuse memory; and a step in which the offset of magnetic sensitivity is corrected according to the temperature of said geomagnetic sensor, and said corrected offset is stored in said fuse memory.

With this invention, the sensitivity property of the temperature measurement means provided in the geomagnetic sensor is obtained in advance, and stored in the fuse memory at the time of manufacture of the geomagnetic sensor; the sensitivity property of the temperature measurement means is corrected according to the pertinent sensitivity property data; the offset of the temperature of the geomagnetic sensor having a temperature property is corrected according to the pertinent temperature; and the pertinent offset is stored in the fuse memory.

The first set of inventions of this application also comprises a geomagnetic sensor correction method for correcting the measurement values of a geomagnetic sensor, which possesses a step in which correction of measurement values is conducted based on the measurement values of a zero magnetic field at the time of manufacture of said geomagnetic sensor.

With this invention, at the time of manufacture of the geomagnetic sensor, the measurement values are corrected based on the measurement values of a zero magnetic field.

The first set of inventions of this application has the effect that the measurement values of the geomagnetism detection means are corrected based on the correction values of the measurement values of the geomagnetism detection means stored by the fuse memory, and that the measurement values of the geomagnetism detection means can be accurately obtained. As with conventional geomagnetic sensors, there is also the effect that, compared to the storage of offset values in EEPROM, there is no need for a special process when manufacturing the chip, and the chip can be manufactured using the ordinary C-MOS process. Moreover, there is the effect that a high voltage generation circuit, writing circuit and the like are unnecessary for writing, and one can strive for a smaller scale memory drive system. Moreover, as the correction values are stored by physically cutting fuses, there is the effect that one can eliminate changes in the pertinent correction values over time.

With the first set of inventions of this application, as the offset of the geomagnetic sensor is corrected by the temperature measurement means that stores the sensitivity property data of the geomagnetic sensor in the fuse memory, as the pertinent offset is stored in the fuse memory, and as the measurement values of the geomagnetic sensor are corrected by the pertinent offset, there is the effect that the measurements of the geomagnetic sensor can be accurately conducted in each chip even relative to temperature.

According to the first set of inventions of this application, this invention has the effect that, the measurement values in a zero magnetic field are calibrated at the time of manufacture of the geomagnetic sensor, and measurement of greater accuracy can be conducted.

Below, in this specification, the so-called fuse that changes an electrically connected state to a cut state, and the anti-fuse that changes an electrically cut state to a connected state are referred to as fuses without particular differentiation, and the memory utilizing this structure is referred to as a fuse memory.

"A fuse is physically cut" signifies that a means for performing electrical cut-off of a fuse element—using physical means including ones that do so electrically, or with energy beams such as laser beams, or with charged beams like electron beams from an electron gun and FIB (Focused Ion Beams), etc.—cuts the electrical connection of the material forming the fuse element, or induces the state where electrical conductivity is blocked by creating high resistance to the extent where one may judge that cut-off has substantially occurred.

The second set of inventions of this application has been made in light of the foregoing circumstances, and its purpose is to offer a temperature sensor and a temperature sensor correction method able to correct variations and seek improvement in accuracy with regard to measurement values by providing a fuse memory, storing initial values and correction values, and correcting the measurement values in accordance with the pertinent initial values and correction values.

In order to achieve the aforementioned purpose, this invention offers the following means.

The second set of inventions of this application comprises a temperature detection means for detecting temperature; a fuse memory that is a fuse memory possessing a plurality of memory units, that enables the selective electrical cut-off or connection of each of said memory units, and that stores prescribed data according to the state of electrical cut-off or connection in each of said memory units; a correction data writing means for inputting the measurement values of said temperature detection means at the time of manufacture, for obtaining initial values that correct the measurement values of said temperature detection means based on said measurement values, for obtaining correction values that correct the sensitivity property of said temperature detection means based on said measurement values, and for writing said initial values and said correction values into said fuse memory by selectively conducting electrical cut-off or connection of each of the memory units contained in said fuse memory according to said initial values and said correction values; a correction data reading means for reading said initial values and correction values from said fuse memory at times of actual use after manufacture; and a correction means for inputting the measurement values of said temperature detection means at said times of actual use, and for conducting correction of the measurement values of said temperature detection means based on the initial values and correction values read by said correction data reading means.

According to this invention, prior to manufacture of the temperature sensor, the correction data writing means obtains the initial values that correct the measurement values of the temperature detection means from the measurement values of the temperature detection means, obtains the correction values that correct the sensitivity property of the temperature detection means from the pertinent measurement values, and writes them into the fuse memory. At times of actual use of the temperature sensor, the initial values and correction values are read from the fuse memory by the correction data reading means, and the measurement values of the temperature detection means are corrected based on the pertinent initial values and correction values by the correction means, with the result that one can reduce the variations in temperature properties among the individual temperature sensors, and can reduce the differences in measurement values among the individual temperature sensors.

The second set of inventions of this application also comprise a temperature sensor correction method for correcting measurement data in a temperature sensor comprising a temperature detection means for detecting temperature, a control means for processing the measurement values of said temperature detection means, and a fuse memory for enabling selective electrical cut-off by the flow of electric current, and for storing correction data used in correction by said correction means according to the state of electrical cut-off; comprising a step in which the measurement values of said temperature detection means are inputted by said control means at the time of manufacture, the initial values that correct the variation in measurement values of said temperature detection means are obtained based on said measurement values, the correction values that correct the variation in sensitivity of said temperature detection means are obtained based on said measurement values, and said initial values and said correction values are written into said fuse memory by conducting electrical cut-off of said fuse memory according to said initial values and said correction values; a step in which said initial values and correction values are read from said fuse memory by said control means at times of actual use after manufacture; and a step in which the measurement values of said temperature detection means are inputted by said control means at said times of actual use, and the measurement values of said temperature detection means are corrected based on the initial values and correction values read by said correction data reading means.

With this invention, the correction data writing means obtains the initial values that correct the measurement values of the temperature detection means from the measurement values of the temperature detection means prior to manufacture of the temperature sensor, obtains correction values that correct the sensitivity property of the temperature detection means from the pertinent measurement values, and writes them into the fuse memory; the correction data reading means reads the initial values and correction values from the fuse memory at times of actual use of the temperature sensor; and the correction means corrects the measurement values of the temperature detection means based on the pertinent initial values and correction values. Consequently, it is possible to reduce the variations in temperature properties among the individual temperature sensors, and to reduce the differences in measurement values among the individual temperature sensors.

The second set of inventions of this application is also a temperature sensor correction method, wherein the aforementioned correction data writing step comprises: processing that subtracts the preset logic value pertaining to the first temperature of the temperature detection means from the measurement value pertaining to the first temperature of said temperature detection means, and calculates said correction value; processing that divides the value obtained by subtracting the measurement value pertaining to the first temperature of said temperature detection means from the measurement value pertaining to the second temperature of said temperature detection means by the value obtained by subtracting said first temperature from said second temperature; and processing that writes said initial values and said correction values into said fuse memory by selective electrical cut-off or connection of each memory unit contained in said fuse memory according to said initial values and said correction values.

With this invention, in the correction data writing step, the initial value and correction value are calculated according to the first temperature and second temperature, the measurement values of the temperature detection means at the pertinent temperatures, the theoretical value of the temperature detection means at the first temperature, and the theoretical value for the sensitivity of the temperature detection means, and the pertinent values are written into the fuse memory.

The second set of inventions of this application has the effect that the measurement values of the temperature detection means can be corrected based on the initial value and correction value of the measurement value of the temperature detection means, and that the measurement values of the temperature detection means can be accurately obtained.

The second set of inventions of this application has the effect that the initial value and the correction value of the temperature detection means can be calculated according to the measurement values, etc. of the first temperature and the second temperature, and efficiently stored in a fuse memory that is advantageous for the storage of small-capacity data. Moreover, as the initial value and correction value are stored in memory by the physical cutting of fuses, there is the effect that changes in the pertinent initial value and correction value can be eliminated.

In light of these circumstances, the third set of inventions of this application pertains to a geomagnetism detection device possessing a geomagnetism detection element for detecting the transverse axial components of geomagnetism and a nonvolatile memory element of the thermal metamorphic type for storing the correction data of the detection outputs of the geomagnetism detection element, where a technology is offered that enables downsizing of the nonvolatile memory element of the thermal metamorphic type.

In order to accomplish the aforementioned task, the third set of inventions of this application offers a geomagnetism detection device comprising a geomagnetism detection element for detecting the transverse axial components of geomagnetism and a nonvolatile memory element of the thermal metamorphic type for storing the correction information of the detection outputs of the pertinent geomagnetism detection element, wherein said correction information consists of axial sensitivity correction coefficients and interaxial correction coefficients as well as values expressed as ratios relative to the axial sensitivity correction coefficient of either axis.

The third set of inventions of this application offers a geomagnetism detection device wherein said nonvolatile memory element stores the minimum amount of correction information pertaining to axial sensitivity correction coefficients other than said axial sensitivity correction coefficient of either axis.

The third set of inventions of this application offers a geomagnetism detection device which uses a differential value obtained by subtracting a preset standard value from the ratio of the pertinent axial sensitivity correction coefficient relative to an axial sensitivity correction coefficient as the correction information pertaining to an axial sensitivity correction coefficient other than said axial sensitivity correction coefficient of either axis.

The third set of inventions of this application offers a geomagnetism detection device provided with a correction computation circuit for conducting correction computation pertaining to the detection outputs of said geomagnetism detection element, wherein this correction computation circuit calculates the correction value of the detection output by multiplying the axial sensitivity correction coefficient by the detection output to conduct correction, and by adding to it the correction term obtained by multiplying the interaxial correction coefficient by the detection output of the other axis.

The third set of inventions of this application offers a geomagnetism detection device provided with a correction computation circuit for conducting correction computation of the detection outputs of said geomagnetism detection element, wherein this correction computation circuit conducts correction computation after adding said standard value to said differential value, and restoring the axial sensitivity correction coefficient.

The third set of inventions of this application offers a geomagnetism detection device wherein said correction computation circuit conducts computation by substituting a preset alternate value for correction coefficients that are unobtainable from said correction data.

In order to accomplish the aforementioned task, the third set of inventions of this application is a geomagnetism detection device comprising a geomagnetism detection element for detecting the geomagnetism of each transverse axial component, and a nonvolatile memory element of the thermal metamorphic type for storing one piece or a plurality of pieces of correction data for correcting said detected geomagnetism values, wherein each piece of said correction data is expressed as the value of a ratio of an axial sensitivity correction coefficient, or interaxial correction coefficient, or a differential value obtained by subtracting a preset standard value from an axial sensitivity correction coefficient relative to the axial sensitivity correction coefficient of either axis.

The third set of inventions of this application offers a geomagnetism detection device wherein at least one piece of said correction data is a value of the ratio of an axial sensitivity correction coefficient other than one pertaining to said either axis relative to the axial sensitivity correction coefficient of said either axis.

The third set of inventions of this application offers a geomagnetism detection device wherein at least one piece of said correction data is a value of the ratio of a differential value obtained by subtracting a prescribed standard value from an axial sensitivity correction coefficient pertaining to other than either of said axes, relative to said axial sensitivity correction coefficient of either axis.

The third set of inventions of this application offers a geomagnetism detection device provided with a correction computation circuit for correcting the geomagnetism value of each transverse axial component detected by said geomagnetism detection element, where said correction computation circuit obtains a corrected geomagnetism value by computing the sum of a multiplication value obtained by multiplying the geomagnetism value of a specified axial component by an addition value obtained by adding a prescribed value to the ratio of the axial sensitivity correction coefficient of said specified axial component, or of a differential value obtained by subtracting a prescribed standard value from the axial sensitivity correction coefficient of said specified axial component, relative to said axial sensitivity correction coefficient of either axis, and a multiplication value obtained by multiplying the geomagnetism value of the other axial component by the value of the ratio of said interaxial correction coefficient relative to the axial sensitivity correction coefficient of either of said axial components.

The third set of inventions of this application offers a geomagnetism detection device provided with a correction computation circuit for correcting the geomagnetism value of each transverse axial component detected by said geomagnetism detection element, where said correction computation circuit obtains a corrected geomagnetism value by calculating a multiplication value obtained by multiplying the geomagnetism value of a specified axial component by an addition value obtained by adding a prescribed value to the ratio of the axial sensitivity correction coefficient of said specified axial component, or of a differential value obtained by subtracting a prescribed standard value from the axial sensitivity correction coefficient of said specified axial component, relative to said axial sensitivity correction coefficient of either axis.

The third set of inventions of this application offers a geomagnetism detection device where said nonvolatile memory element of the thermal metamorphic type signifies a fuse memory.

Moreover, the third set of inventions of this application offers a geomagnetism detection device where the said prescribed standard value is the said axial sensitivity correction coefficient of either axis.

By means of this above-described invention, the value taken from the ratio of the other axial sensitivity correction coefficient relative to the axial sensitivity correction coefficient of either axis is stored in a nonvolatile memory element of the thermal metamorphic type, with the result that the correction information can be made more compact, and the memory capacity of the nonvolatile memory element of the thermal metamorphic type can be reduced, while maintaining correction accuracy by conducting interaxial correction.

Moreover, the axial sensitivity correction coefficient of either axis and the interaxial correction coefficient can be omitted from the correction information, and the correction information can be made still more compact, and the memory capacity of the nonvolatile memory element can be further reduced.

Moreover, by adopting the differential value obtained by subtracting a standard value from the sensitivity correction coefficient of the other axis as correction information, the correction information can be made still more compact, and the memory capacity of the nonvolatile memory element can be further reduced.

LEGEND

1 . . . geomagnetic sensor, 11 . . . control logic circuit (correction data writing means) (correction data reading means) (correction means) (control means), 12 . . . geomagnetism sensor circuit (geomagnetism detection means), 13 . . . fuse memory 201 . . . temperature sensor, 211 . . . control logic circuit (correction data writing means) (correction data reading means) (correction means) (control means), 212 . . . temperature sensor circuit (temperature detection means), 213 . . . fuse memory 301 . . . LSI, 302 . . . power source terminal, 303 . . . ground terminal, 304 . . . chip select input terminal, 305 . . . data input terminal, 306 . . . data output terminal, 307 . . . interface circuit, 308 . . . control circuit, 309 . . . internal oscillator circuit, 310 . . . magnetic sensor of X axis direction, 311 . . . magnetic sensor of Y axis direction, 312 . . . changeover circuit, 313 . . . amplifier, 314 . . . A/D conversion circuit, 315 . . . fuse memory, 321 . . . fuse, 322 . . . FET, 323 . . . data flip-flop, 324 . . . NOR gate, 325 . . . logic gate

BEST MODE FOR CARRYING OUT THE INVENTION

The first embodiment of the first set of inventions of this application is explained below with reference to drawings.

Figure 1:
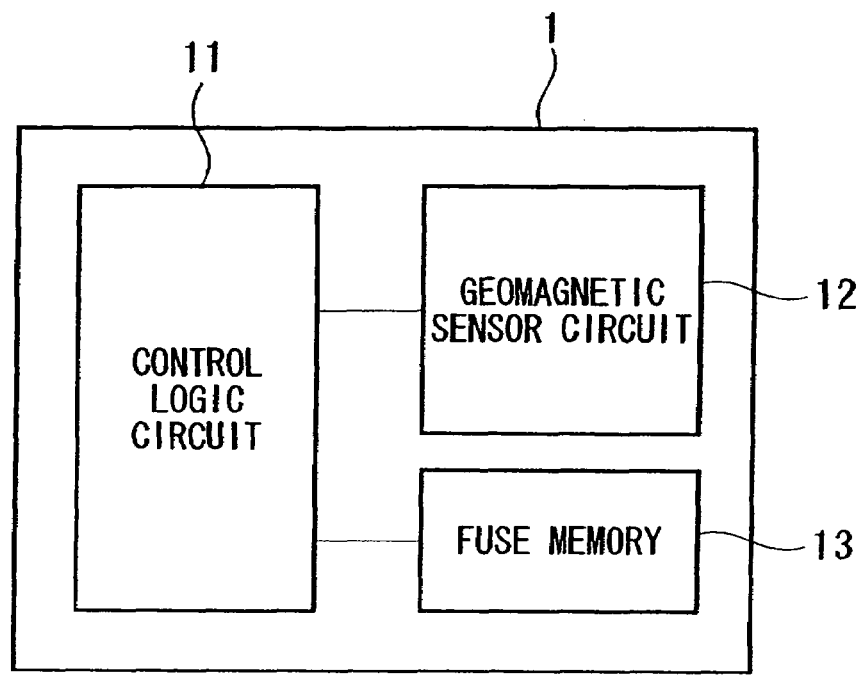
FIG. 1 is a drawing that shows the configuration of geomagnetic sensor 1 in the respective embodiments of the first set of inventions of this application.

As shown in FIG. 1, the geomagnetic sensor 1 of this embodiment is configured on 1 chip, and consists of the control logic circuit 11 (correction data writing means) (correction data reading means) (correction means) that controls the geomagnetic sensor 1, the geomagnetic sensor circuit 12 (geomagnetism detection means) configured from an A/D (Analog/Digital) converter and a geomagnetic sensor element that detects geomagnetism in the respective axial directions (magnetic sensitivity directions) of the mutually perpendicular X axis and Y axis, and that consists of, for example, a GMR (Giant Magnetoresistive) element, and the fuse memory 13.

The geomagnetic sensor circuit 12 uses the A/D converter to conduct A/D conversion of the measurement values of the magnetic field in the X axis direction and Y axis direction obtained by the geomagnetic sensor element, and outputs them to the control logic circuit 11. When the geomagnetic sensor 1 is installed in the cell phone device, under circumstances where the pertinent cell phone device is rotated, the control logic circuit 11 reads the plurality of measurement values indicating the ambient magnetic field measured by the geomagnetic sensor circuit 12, obtains the offset value of the geomagnetic sensor circuit 12 based on the pertinent measurement values, and stores the pertinent value in the fuse memory 13.

Moreover, the control logic circuit 11 digitally corrects the measurement values from the geomagnetic sensor circuit 12 by reading the offset value from the fuse memory 13, and conducting arithmetic processing of the pertinent value and the measurement values from the geomagnetic sensor circuit 12.

The geomagnetic sensor 1 is provided with a physical quantity sensor that is not illustrated in the drawing, and this physical quantity sensor contains a temperature sensor (temperature measurement means). The control logic circuit 11 reads the ambient temperature data from the pertinent temperature sensor, writes the offset value corresponding to the pertinent ambient temperature into the fuse memory 13, and reads the offset value corresponding to the pertinent ambient temperature from the fuse memory 13.

Figure 2A:
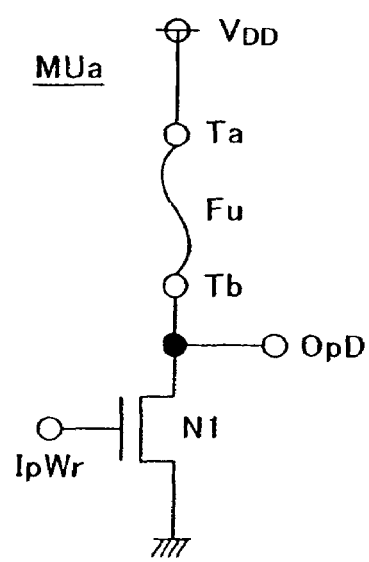
FIG. 2A is a drawing that shows the configuration of memory unit MUa in these same embodiments.

The fuse memory 13 possesses the memory units MUa shown in FIG. 2A according to the number of bits of memory capacity. For example, a fuse memory 13 with a memory capacity of 32 bits has 32 memory units MUa. The memory unit MUa is configured from the N-channel MOS transistor N1, and fuse FU inserted between the terminal Ta connected to the power source voltage VDD of the geomagnetic sensor 1 and the terminal Tb connected to the drain of the MOS transistor. The fuse Fu is formed from polyside (polysilicon). The writing voltage input terminal IpWr is connected to the gate of the MOS transistor N1, and the data output terminal OpD is connected to the drain of the MOS transistor N1.

The MOS transistor N1 is formed on the chip at a size enabling the flow of current between the drain and the source generating the heat required for cutting the fuse Fu when the MOS transistor N1 has been turned on by the gate. For example, the MOS transistor N1 is formed to a channel length of L=0.65 µm and a channel width of W=140 µm.

Figure 2B:
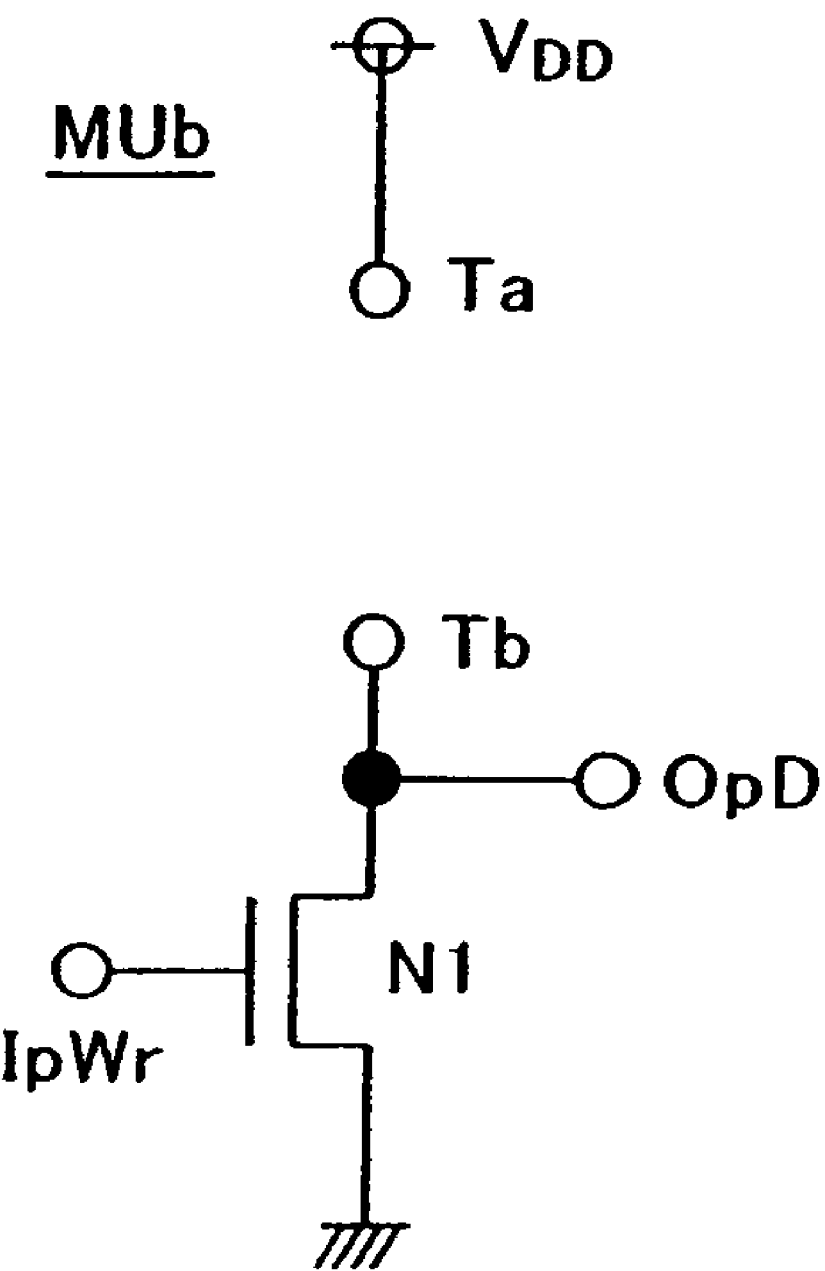
FIG. 2B is a drawing that shows the configuration of memory unit MUb in these same embodiments.

In a state where power source voltage VDD is applied to the memory unit MUa, when voltage is applied from the writing voltage input terminal IpWr to the MOS transistor gate at or above the voltage (threshold value of MOS transistor N1) that turns on the MOS transistor N1, the MOS transistor N1 is turned on, and the fuse Fu is cut by the heat generated by the current flowing between the drain and the source. As a result, the memory unit MUa adopts a configuration where the fuse Fu is eliminated as shown in FIG. 2B. This is hereinafter referred to as memory unit MUb.

On the other hand, when voltage at or below the threshold value of the MOS transistor N1 is applied from the writing voltage input terminal IpWr to the MOS transistor gate, the MOS transistor N1 is turned off, current does not flow between the drain and the source, and the fuse Fu is not cut. As described above, the fuse Fu is only cut so as to constitute the configuration of memory unit MUb in the case where voltage is inputted to the writing voltage input terminal IpWr at or above the threshold value of the MOS transistor N1.

Next, with regard to the aforementioned memory unit MUa, when the power source voltage VDD is applied such that voltage at or below the threshold value of the MOS transistor N1 is applied to the writing voltage input terminal IpWr, as the MOS transistor N1 is off, the power source voltage VDD appears in the data output terminal OpD via the fuse Fu. At this time, as the input resistance of the input terminal of the C-MOS (Complementary MOS) logic circuit connected to the data output terminal OpD is high, there is almost no current (discharge current) flowing from the data output terminal OpD, and the fuse Fu is not cut by the pertinent current.

On the other hand, in the aforementioned memory unit MUb, even if power source voltage VDD is applied such that voltage at or below the threshold value of the MOS transistor N1 is applied to the writing voltage input terminal IpWr, as the MOS transistor N1 is off, and as the fuse Fu is cut, the power source voltage VDD is not transmitted to the data output terminal OpD.

As described above, under circumstances where power source voltage VDD is applied in memory unit MUa, the fuse Fu is cut by the application of voltage at or above the threshold value of the MOS transistor N1 to the writing voltage input terminal IpWr, thereby constituting memory unit MUb. In memory unit MUb, when power source voltage VDD is applied such that voltage at or below the threshold value of the MOS transistor N1 is applied to the writing voltage input terminal IpWr, voltage is not outputted to the data output terminal OpD.

On the other hand, under circumstances where power source voltage VDD is applied in memory unit MUa, the fuse Fu is not cut by the application of voltage at or below the threshold value of the MOS transistor N1 to the writing voltage input terminal IpWr. In memory unit MUa, when power source voltage VDD is applied such that voltage at or below the threshold value of the MOS transistor N1 is applied to the writing voltage input terminal IpWr, the power source voltage VDD is outputted to the data output terminal OpD.

For example, input data can be stored in the memory by having each voltage value correspond to the input and output data in the following manner. That is, one uses a MOS transistor N1 where the threshold value is half of the value of the power source voltage VDD (VDD/2). With regard to the voltage applied to the writing voltage input terminal IpWr, voltage at or below the threshold value of the MOS transistor N1 (for example, ground level, hereinafter referred to as "low level") is made to correspond to the data "0", while voltage at or above the threshold value of the MOS transistor N1 (for example, VDD, hereinafter referred to as "high level") is made to correspond to the data "1." With regard to voltage outputted to the data output terminal OpD, the low level is made to correspond to the data "1," and the high level is made to correspond to the data "0."

By conducting settings in the above-described manner, under circumstances where the power source voltage VDD is applied, data corresponding to the voltage applied to the writing voltage input terminal IpWr is stored according to the form of existence of the fuse Fu. By applying the low level to the writing voltage input terminal IpWr, the voltage corresponding to data stored according to the form of existence of the fuse Fu appears in the data output terminal OpD.

Based on the foregoing, with regard to memory unit MUa, under circumstances where power source voltage VDD is applied, the operations where the high level or low level is applied to the writing voltage input terminal IpWr according to the data and where the pertinent data is stored according to the existence of fuse Fu are referred to as "writing."

With regard to memory unit MUa or MUb where data is stored according to the form of existence of fuse Fu, the operations whereby the voltage corresponding to the pertinent data is extracted from the data output terminal OpD by the application of the low level to the writing voltage input terminal IpWr in a state where the power source voltage VDD is applied are referred to as "reading."

The control logic circuit 11 supplies power source voltage VDD to the fuse memory 13, and by imparting the high level only to the writing voltage input terminal IpWr of the memory unit MUa corresponding to the bit where the data "1" is to be stored among the memory units MUa in the fuse memory 13, it cuts the fuse Fu of the pertinent memory unit MUa. Consequently, the memory unit corresponding to the bit where the data "1" is to be stored adopts the configuration of memory unit MUb, and the data is stored. Consequently, the fuse Fu corresponding to the bit where the data "1" is to be stored is cut, and "writing" of the data "1" is conducted. On the other hand, the fuse Fu corresponding to the bit where the data "0" is to be stored is not cut, and "writing" of the data "0" is conducted.

Data "reading" is conducted in the control logic circuit 11 from the data output terminal OpD by having the control logic circuit 11 supply power source voltage VDD to the fuse memory 13, and impart the low level to the writing voltage input terminal IpWr, and by outputting the voltage corresponding to the data stored according to the form of existence of fuse Fu.

Next, an explanation is made with regard to the fuse memory 13 actually used in this embodiment, and the timing at times of data writing and data reading. The aforementioned fuse memory 13 serially outputs the data of 4 bits as described in detail.

Figure 3:
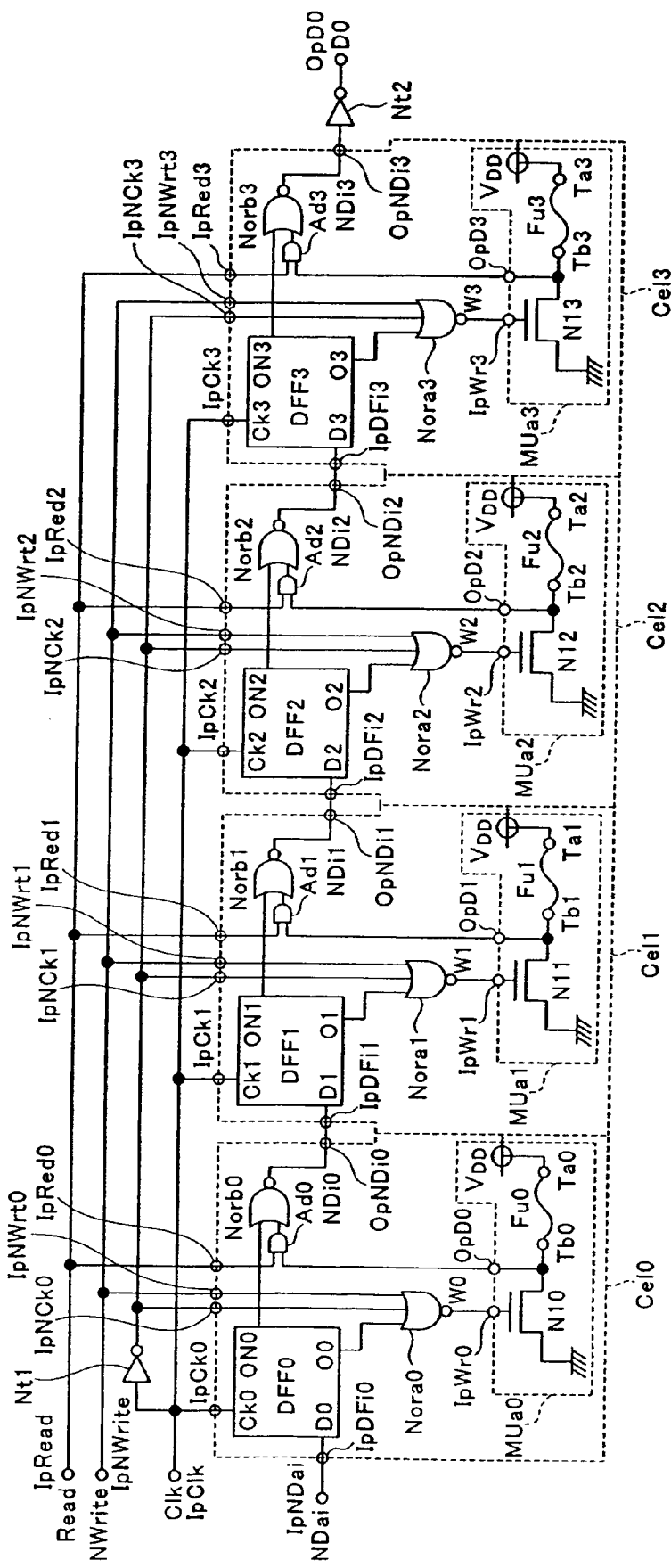
FIG. 3 is a circuit diagram of the fuse memory 13 during data writing in these same embodiments.

FIG. 3 is a drawing that shows the fuse memory 13 and timing at the time of writing in this embodiment. In FIG. 3, the fuse memory 13 is configured from the memory cells Cel0-Cel3 and the NOT gates (inversion circuits) Nt1-2. As the memory cells Cel0-Cel3 have the identical configuration, an explanation is given below regarding memory cell 10.

The memory cell Cel0 is configured from the memory unit MUa shown in FIG. 2A, the D Flip-Flop (Delay Flip-Flop) DFF (hereinafter referred to as DFF), the double input AND gate Ad, the triple input NOR gate Nora, and the double input NOR gate Norb. As stated above, memory cells Cel0-Cel3 have the same configuration, and a suffix for the pertinent memory cells Cel0-Cel3 is affixed below to the end of the codes of each of the aforementioned constituent elements. Thus, the DFF in memory cell Cel0 is DFF0, while the DFF in memory cell Cel2 is DFF2. Consequently, the constituent elements of memory cell Cel0 are the D Flip-Flop DFF0, the AND gate Ad0, and the NOR gates Nora0 and Norb0.

The positive data output terminal O0 of DFF0 is connected to one of the three input terminals of the NOR gate Nora0. The negative data output terminal ON0 of DFF0 is connected to one of the input terminals of the NOR gate Norb0. The output terminal of the NOR gate Nora0 is connected to the writing voltage input terminal IpWr0 of memory unit MUa0. The data output terminal OpD0 of memory unit MUa0 is connected to one of the input terminals of the AND gate Ad0. The output terminal of the AND gate Ad0 is connected to the other input terminal of the NOR gate Norb0.

Memory cell Cel0 is provided with the following input terminals and output terminal, and the respective input terminals or output terminal are connected in the following manner. That is, memory cell Cel0 is provided with input terminals IpCk0, IpNCk0, IpNWrt0, IpRed0 and IpDFi0, and is provided with output terminal OpNDi0. Input terminal IpCk0 is connected to the clock input terminal Ck0 of DFF0. Input terminals IpNCk0 and IPNWrt0 are respectively connected to the remaining two input terminals of the NOR gate Nora0. Input terminal IpRed0 is connected to the other input terminal of the AND gate Ad0. Input terminal IpDFi0 is connected to the data input terminal D0 of DFF0. The output terminal OpNDi0 is connected to the output terminal of the NOR gate Norb0.

The fuse memory 13 is provided with the input terminals IPClk, IpNWrite, IpRead, IpNDai, and the output terminal OpDo. Input terminal IpClk is connected to input terminal IpCk0 of memory cell Cel0. It is also connected to input terminal IpNCk0 of memory cell Cel0 via the NOT gate Nt1. Input terminal IpNWrite is connected to input terminal IpNWrt0 of memory cell Cel0. Input terminal IpRead is connected to input terminal IpRed0 of memory cell Cel0.

Input terminal IpClk is also connected to the input terminals IpCk1-IpCk3 of memory cells Cel1-Cel3. It is also connected to the input terminals IpNCk1-IpNCk3 of memory cells Cel1-Cel3 via the NOT gate Nt1. Input terminal IpNWrite is also connected to the input terminals IpNWrt1-IpNWrt3 of memory cells Cel1-Cel3. Input terminal IpRead is also connected to the input terminals IpRed1-IpRed3 of memory cells Cel1-Cel3.

Input terminal IpNDai of the fuse memory 13 is connected to input terminal IpDFi0 of memory cell Cel0. Output terminal OpNDi0 of memory cell Cel0 is connected to input terminal IpDFi1 of memory cell Cel1. Output terminal OpNDi1 of memory cell Cel1 is connected to input terminal IpDFi2 of memory cell Cel2. Output terminal OpNDi2 of memory cell Cel2 is connected to input terminal IpDFi3 of memory cell Cel3. Output terminal OpNDi3 of memory cell Cel3 is connected to the output terminal OpDo of the fuse memory via NOT gate Nt2.

Figure 4:
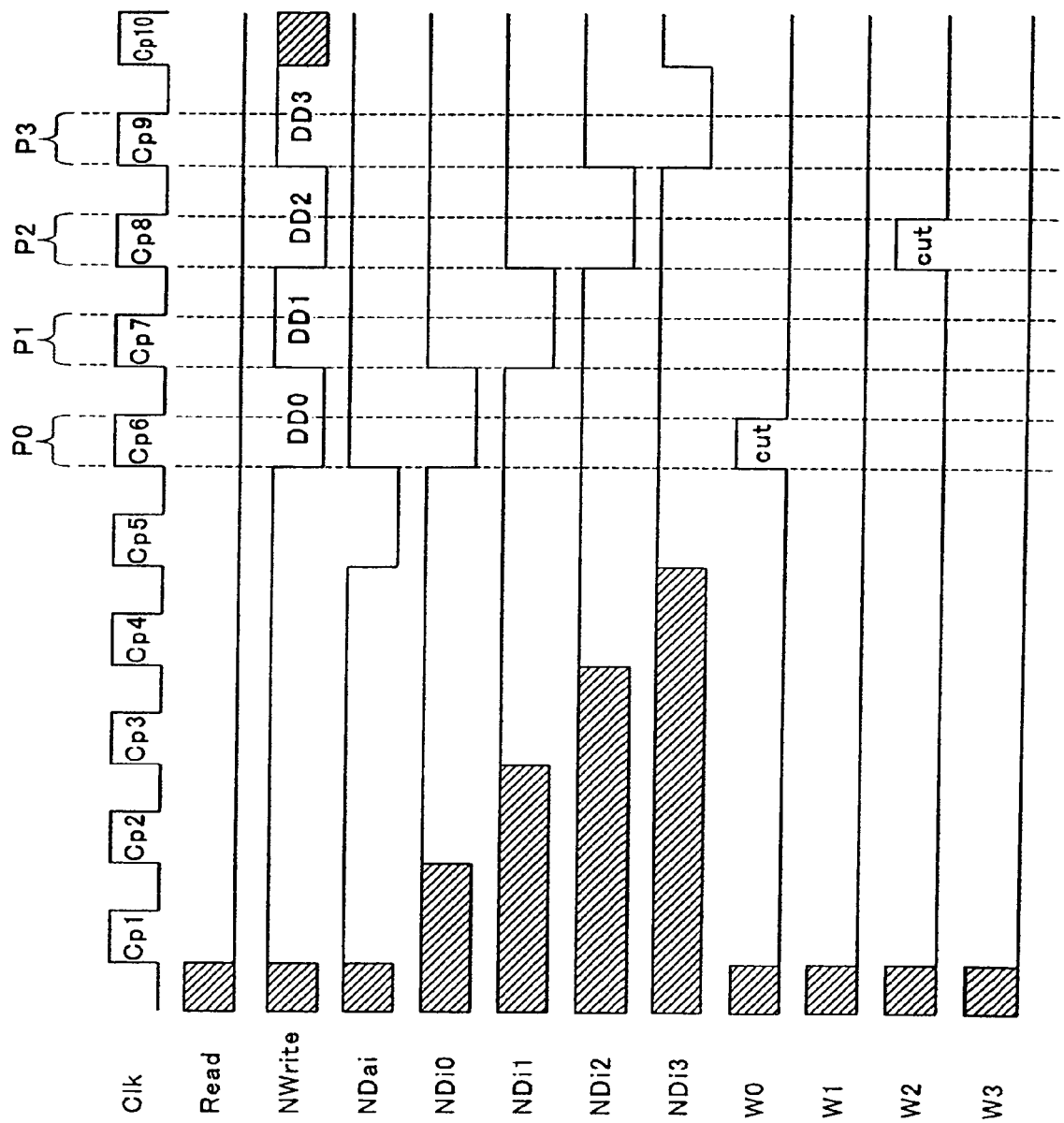
FIG. 4 is a drawing that shows the timing of the fuse memory 13 during data writing in these same embodiments.

Next, an explanation is made regarding the operations for writing data into the fuse memory 13. In this instance, as shown in FIG. 4 (timing chart), the data DD0 and DD2 ("1": low level) are written into memory cells Cel0 and Cel2, and data DD1 and DD3 ("0": high level) are written into memory cells Cel1 and Cel3. Moreover, the diagonally lined parts in the pertinent timing chart indicate level indeterminate, that is the adoption of a voltage value of either high level (=VDD) or low level (=ground level).

First, before the clock pulse Cp1 of the clock Clk is outputted, the signals Read, NWrite and NDai are set to level indeterminate, and the output signals NDi0-NDi3 of each memory cell Cel0-Cel3 and the output signals W0-W3 of NOR gates Nora0-Nora3 are set to level indeterminate.

Next, the clock pulse Cp1 is outputted. In synchronization with start-up of the clock pulse Cp1, the signal Read is set to low level, and the signals NWrite and NDai are set to high level. Consequently, the signal NDai (high level) is taken into the data input terminal D0 of DFF0.

As the signal NWrite is high level, high level is inputted to one of the input terminals of NOR gates Nora0-Nora3. Regardless of the signals inputted to the other input terminals—that is, regardless of the levels of the output signals of the data output terminals O0-O3 of DFF0-DFF3 and the input signals in the input terminals IpNCk0-IpNCk3 of memory cells Cel0-Cel3—the NOR gates Nora0-Nora3 output the output signals W0-W3 at low level. This is referred to below as "the output signal of the NOR gate Nora0 is fixed at low level." Consequently, the respective memory units MUa0-MUa3 of the respective memory cells Cel0-Cel3 do not conduct the aforementioned writing operations. Subsequent to this, the signal Read is maintained at low level.

When clock pulse Cp2 is outputted, a low level signal, which is the inversion result of the signal NDai (high level) previously taken into data input terminal D0 is outputted to the negative output terminal ON0 of DFF0, and inputted to one of the input terminals of NOR gate Norb0.

As the signal Read is here maintained at low level, the output signal of the AND gate Ad0 is fixed at low level. Consequently, the signal of the other input terminal of NOR gate Norb0 is fixed at low level. Consequently, NOR gate Norb0 operates as a NOT gate relative to the signal inputted from one of the input terminals, inverts the input signal, and outputs it. This is referred to below as "NOR gate Norb0 is opened as a NOT gate relative to the negative data output terminal ON0 of DFF0." As a result, the signal NDi0 in output terminal OpNDi0 of memory cell Cel0 shifts from level indeterminate to high level. Accordingly, the signal (high level) taken into input terminal IpDFi0 of memory cell Cel0 when clock pulse Cp1 is outputted is transmitted to output terminal OpNDi0 of memory cell Cel0 when clock pulse Cp2 is outputted.

As output terminal OpNDi0 of memory cell Cel0 is connected to input terminal IpDFi1 of memory cell Cel1, the signal (high level) taken into input terminal IpDFi0 of memory cell Cel0 when clock pulse Cp1 is outputted is transmitted to input terminal IpDFi1 of memory cell Cel1 when clock pulse Cp2 is outputted. When this occurs, the signal NDi0 (high level) is taken into data input terminal D1 of DFF1 connected to the pertinent input terminal.

Next, when clock pulse Cp3 is outputted, the signal NDi0 (high level) previously inputted into input terminal IpDFi1 in memory cell Cel1 by the aforementioned operations is transmitted to output terminal OpNDi1, and signal NDi1 in the pertinent output terminal OpNDi1 shifts from level indeterminate to high level. When this occurs, the signal NDi1 in the pertinent output terminal OpNDi1 is outputted to input terminal IpDFi2 of memory cell Cel2.

Next, when clock pulse Cp4 is outputted, the signal NDi1 (high level) previously inputted into input terminal IpDFi2 in memory cell Cel2 is transmitted to output terminal OpNDi2, and signal NDi2 in the pertinent output terminal OpNDi2 shifts from level indeterminate to high level. When this occurs, the signal NDi2 in the pertinent output terminal OpNDi2 is outputted to input terminal IpDFi3 of memory cell Cel3. Next, when clock pulse Cp5 is outputted, the signal NDi2 (high level) previously inputted into input terminal IpDFi3 in memory cell Cel3 is transmitted to output terminal OpNDi3, and signal NDi3 in the pertinent output terminal OpNDi3 shifts from level indeterminate to high level.

As stated above, as high level corresponds to data "0" and low level to data "1" in the data output terminals OpD0-OpD3 of the respective memory units MUa0-MUa3, the signal NDi3 (high level) is inverted by the NOT gate Nt2, and the signal Do (low level) is outputted from output terminal OpDo.

As described above, the fuse memory 13 inputs the signal NDai (high level) from input terminal IpNDai, and changes the signals NDi0-NDi3 in output terminals OpNDi0-OpNDi3 of internal memory cells Cel0-Cel3 from level indeterminate to high level by the clock pulses Cp1-Cp5. Consequently, as shown in FIG. 4, the signal NDai in input terminal IpNDai of internal memory cell Cel0 and the signals NDi0-NDi2 in input terminals IpDFi1-IpDFi3 of memory cells Cel1-Cel3 connected to output terminals OpNDi0-OpNDi2 of memory cells Cel0-Cel2 are initialized from level indeterminate to high level. As a result of the foregoing, the fuse memory 13 operates as a shift register.

On the other hand, data writing operations are conducted by the clock pulses Cp5-Cp9 as described in detail below.

First, when clock pulse Cp5 is outputted, a low level signal is inputted to input terminal IpNDai as the input signal NDai. When clock pulse Cp6 is outputted, a high level signal is inputted to input terminal IpNDai as input signal NDai. As stated above, as the input signal NDai has been initialized at high level before clock pulse Cp5 is outputted, the input signal NDai is low level only during the interval from the output of clock pulse Cp5 until the output of clock pulse Cp6, that is, only during the interval in which one clock pulse is outputted.

This low level input signal NDai is then transmitted to input terminals IpDFi1-IpDFi3 of memory cells Cel1-Cel3 that are being initialized at high level as follows in accordance with the above-described shift register operations of the fuse memory 13, causing the signals NDi0-NDi2 in the respective input terminals to change as follows. That is, as shown in FIG. 4, the signal NDi0 is low level only during the interval from the output of clock pulse Cp6 until the output of clock pulse Cp7. Next, the signal NDi1 is low level only during the interval from the output of clock pulse Cp7 until the output of clock pulse Cp8. Next, the signal NDi2 is low level only during the interval from the output of clock pulse Cp8 until the output of clock pulse Cp9. Next, the signal NDi3 in output terminal OpNDi3 of memory cell Cel3 is low level only during the interval from the output of clock pulse Cp9 until the output of clock pulse Cp10.

The signal NWrite is sequentially changed in synchronization with clock pulses Cp6-Cp9 according to the writing data DD0-DD3, and is outputted. Below, an explanation is made regarding the operations of the fuse memory 13 when clock pulses Cp6-Cp9 are outputted.

First, when clock pulse Cp6 is outputted, the signal NDai (low level) that is in input terminal IpNDai of memory cell Cel0 when clock pulse Cp5 has been outputted is transmitted to the positive data output terminal O0 of DFF0, and is outputted to one of the input terminals of MUa among the three of the NOR gate Nora0 in memory cell Cel0. On the other hand, the low level signal where the signal NWrite corresponds to data DD0 ("1") is outputted to one of the two remaining input terminals of the NOR gate Nora0.

Moreover, the signal where clock pulse Cp6 is inverted by the NOT gate Nt1 is outputted to the remaining input terminal of the NOR gate Nora0. In this case, at the timing (interval P0) where clock pulse Cp6 is high level, a low level signal which is an inverted output is outputted, and at the timing where clock pulse Cp6 is low level, a high level signal which is an inverted output is outputted.

In this case, as a low level signal is outputted to the remaining input terminal of the NOR gate Nora0 in interval P0, low level signals are inputted to all input terminals of the NOR gate Nora0, with the result that the output signal W0 of the NOR gate Nora0 becomes high level, a high level is inputted to data input terminal IpWr0 of memory unit MUa0, the MOS transistor N10 in memory unit MUa0 is turned on, the fuse Fu0 is cut so that "cut" is recorded in the timing chart for the output signal W0 of FIG. 4, and data DD0 ("1": low level) is stored in memory unit MUa0.

At the timing where clock pulse Cp6 is low level, high level is inputted into one of the three input terminals of the NOR gate Nora0, the output signal W0 of the NOR gate Nora0 is fixed at low level, low level is inputted into data input terminal IpWr0 of memory unit MUa0, and the fuse FU0 in memory unit MUa0 is not cut.

In the NOR gates Nora1-Nora3 in the other memory cells Cel1-Cel3 apart from memory cell Cel0, as output signals (=high level) are inputted from the positive output terminals O0-O2 of DFF0-DFF2 where the input signals NDi0-NDi2 (=high level) have been inputted into one of the three input terminals, the output signals W1-W3 of the NOR gates Nora1-Nora3 are fixed at low level, low level is inputted into data input terminals IpWr1-IpWr3 of memory units MUa1-MUa3, and the fuses Fu1-Fu3 in memory units MUa1-MUa3 are not cut.

Next, when clock pulse Cp7 is outputted, a high level signal where the signal NWrite corresponds to data DD1 ("0") is outputted to one of the three input terminals of the NOR gate Nora1. The output signal W1 of the NOR gate Nora1 is fixed at low level, low level is inputted to data input terminal IpWr1 of memory unit MUa1, and the fuse Fu1 in memory unit MUa1 is not cut.

In the NOR gates Nora0 and Nora2-Nora3 in the other memory cells Cel0 and Cel2-Cel3 apart from memory cell Cel1, as output signals (=high level) of the positive output terminals O0 and O2-O3 of DFF0 and DFF2-DFF3 are inputted into any one of the three input terminals, the output signals W0 and W2-W3 of the NOR gates Nora 0 and Nora2-Nora3 are fixed at low level, low level is inputted into data input terminals IpWr0 and IpWr2-IpWr3 of memory units MUa0 and MUa2-MUa3, and the fuses Fu2-Fu3 in memory units MUa2-MUa3 that have yet to be cut are not cut.

Consequently, the following may be said. That is, the fuses FU0-Fu1 of memory units MUa0-MUa1 are cut when a low level signal has been selectively inputted into input terminal IpNDai or input terminal IpDFi0 among memory cells Cel0-Cel1, at the timing where clock pulses Cp6-Cp7 have become high level, according to the data of the inputted signal NWrite.

Next, when clock pulses Cp8-Cp9 are outputted, the following operations are conducted in accordance with the foregoing. That is, when clock pulse Cp8 is outputted, the low level signal where the signal NWrite corresponds to data DD2 ("1") is outputted to one of the three input terminals of the NOR gate Nora2. At the timing (interval P2) where clock pulse Cp8 is high level, a low level signal which is an inverted output signal is outputted. In this case, as a low level signal which is an inverted output signal is outputted at interval P2, low level signals are inputted into all of the input terminals of the NOR gate Nora2, with the result that the output signal W2 of the NOR gate Nora2 becomes high level, a high level is inputted to data input terminal IpWr2 of memory unit MUa2, the fuse Fu2 in memory unit MUa2 is cut so that "cut" is recorded in the timing chart for the output signal W2 of FIG. 4, and data DD2 (1: low level) is stored in memory unit MUa2.

When clock pulse Cp9 is outputted, a high level signal where the signal NWrite corresponds to data DD3 ("0") is outputted to one of the three input terminals of the NOR gate Nora3. The output signal W3 of the NOR gate Nora3 becomes low level, and the fuse Fu3 in memory unit MUa3 is not cut.

As a result of the above operations, in memory cells Cel0-Cel3, the fuse memory 13 writes the sequentially inputted data DD0-DD3 according to the form of existence of fuses FU0-Fu3 in memory units MUa0-MUa3.

Figure 5:
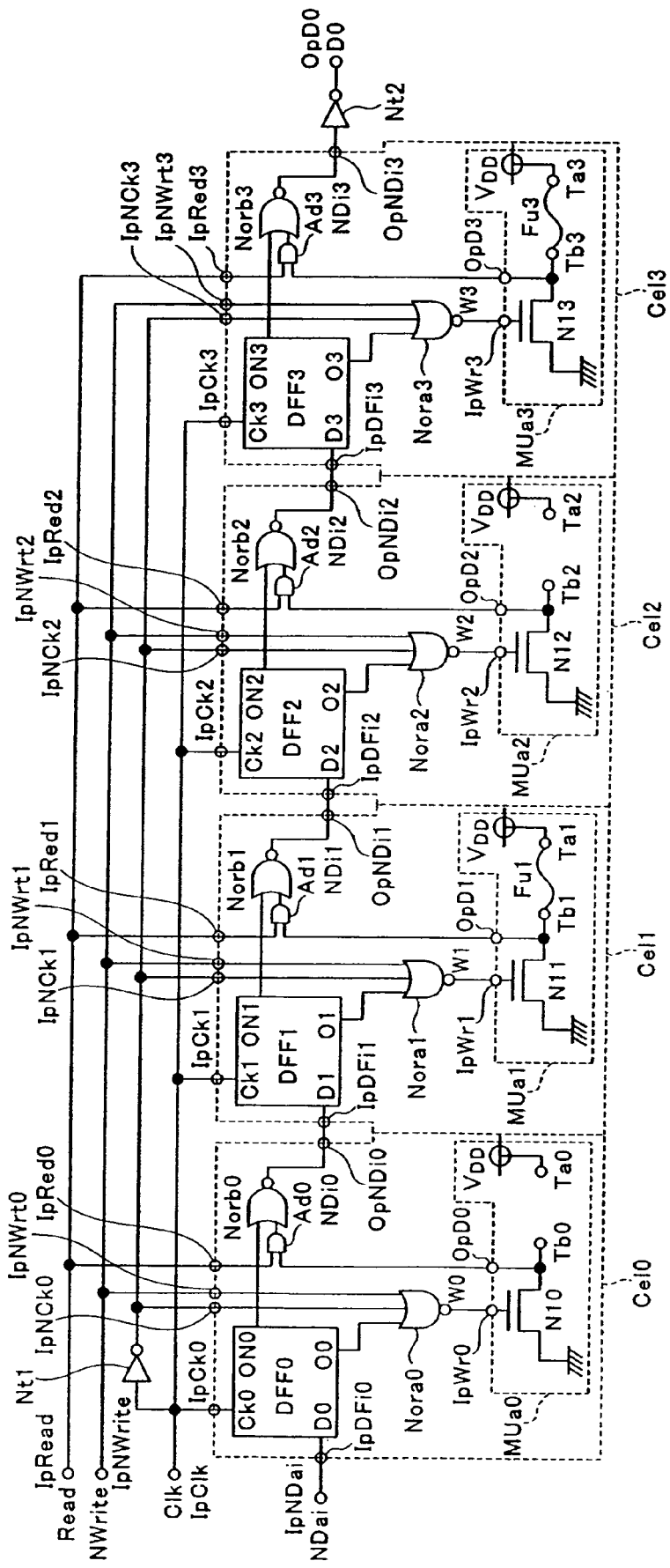
FIG. 5 is a circuit diagram of the fuse memory 13 during data reading in these same embodiments.
Figure 6:
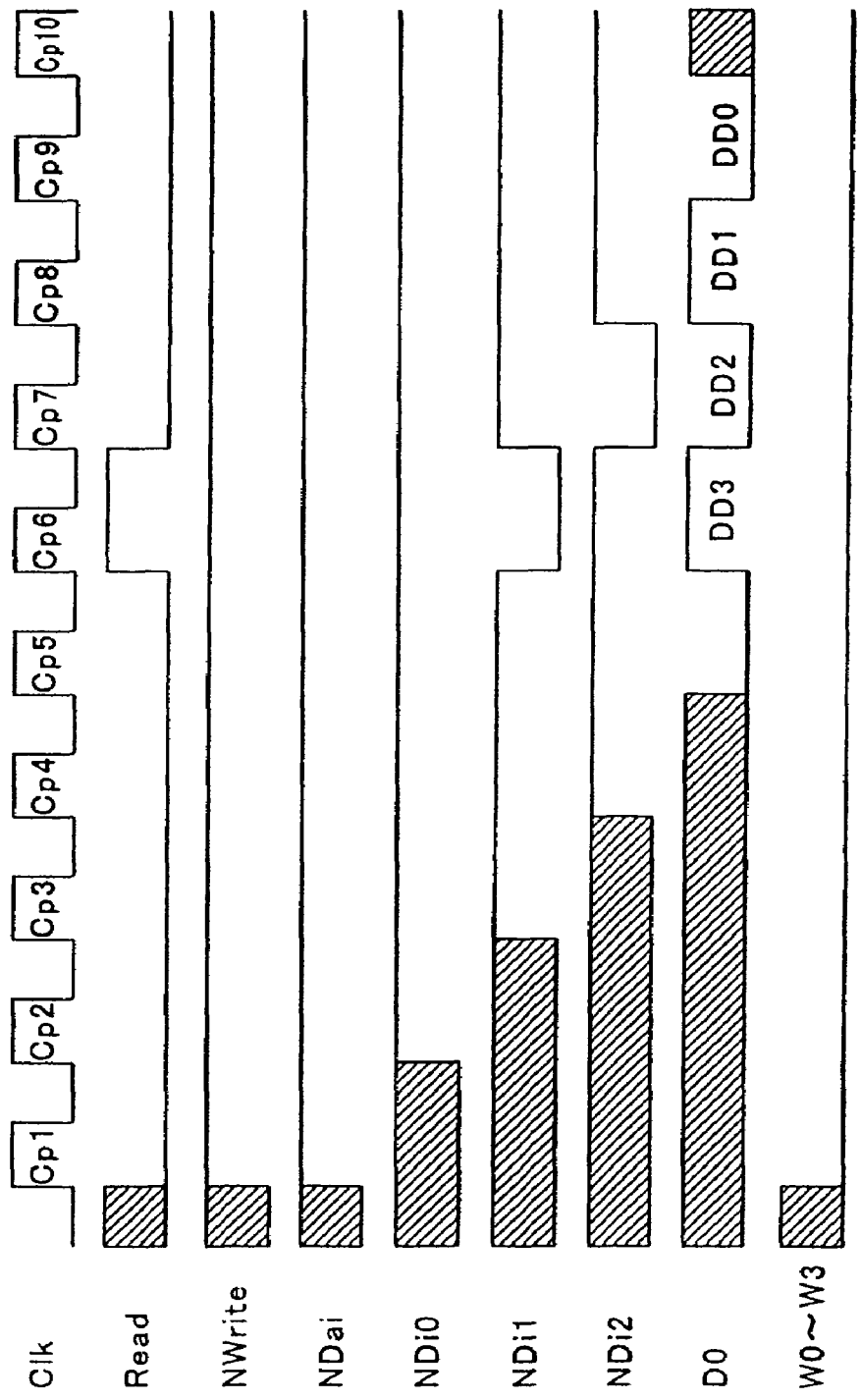
FIG. 6 is a drawing that shows the timing of the fuse memory 13 during data reading in these same embodiments.

Next, the operations whereby data is read from the fuse memory 13 are explained with reference to drawings. As shown in FIG. 5, the fuses FU0 and Fu2 of the two memory units MUa0 and MUa2 of the memory cells Cel0 and Cel2 of the fuse memory 13 shown in FIG. 3 are cut. Consequently, the data DD0 and DD2 that constitute "1" (: low level) are written into memory cells Cel0 and Cel2, and the data DD1 and DD3 constituting "0" (: high level) are written into memory cells Cel1 and Cel3. The timing of reading is shown in the timing chart of FIG. 6.

First, prior to output of clock pulse Cp1 of the clock Clk, the signals Read, Nwrite and NDai are set to level indeterminate, and the output signals NDi0-NDi3 of the respective memory cells Cel0-Cel3 and the output signals W0-W3 of the NOR gates Nora0-Nora3 are set to level indeterminate.

Next, clock pulse Cp1 is outputted, and the signal Read is set to low level, and the signals NWrite and NDai are set to high level in synchronization with the start-up of clock pulse Cp1. Consequently, the signal NDai (high level) is taken into the data input terminal D0 of DFF0.

As the signal NWrite is high level, the output signals of the NOR gates Nora0-Nora3 are fixed at low level, the low level output signals W0-W3 are outputted, and the respective memory units MUa0-MUa3 do not conduct the aforementioned writing operations.

When clock pulse Cp2 is then outputted, a low level signal which is the inverted result of the signal NDai (high level) previously taken into data input terminal D0 is outputted to the negative data output terminal ON0 of DFF0, and inputted one of the input terminals of the NOR gate Norb0. In this case, as the signal Read is maintained at low level, as described above, the NOR gate Norb0 is opened as a NOT gate relative to the negative data output terminal ON0 of DFF0, and the signal inputted to one of the input terminals is inverted, and outputted. As a result, the signal NDi0 in output terminal OpNDi0 of memory cell Cel0 shifts from level indeterminate to high level.

The aforementioned operations are conducted by the output of clock pulses Cp3-Cp5. Consequently, the signals NDai and NDi0-NDi2 are initialized from level indeterminate to high level.

Next, data reading operations are conducted according to the clock pulses Cp6-Cp9 as explained in detail below.

First, when clock pulse Cp6 is outputted, a high level signal is inputted as input signal Read into input terminal IpRead. When clock pulse Cp7 is then outputted, a low level signal is inputted as input signal Read into input terminal IpRead. As stated above, as a low level signal has been inputted as the input signal Read into input terminal IpRead prior to the output of clock pulse Cp6, the input signal Read is high level only during the interval from the output of clock pulse Cp6 until the output of clock pulse Cp7, that is, only during the interval in which one clock pulse is outputted.

In this case, as the signal Read is high level, a high level signal is inputted into one of the input terminals of the AND gates Ad0-Ad3 connected to the other input terminal of the NOR gates Norb0-Norb3, the AND gates Ad0-Ad3 operate as buffers, and the level of the signals (output signals of memory units MUa0-MUa3) inputted to the other input terminal of the AND gates Ad0-Ad3 is transmitted to the other input terminal of the NOR gates Norb0-Norb3.

On the other hand, as the signals NDai and NDi0-NDi2 have been initialized at high level as mentioned above, low level is outputted from the negative data output terminals ON0-ON3 of DFF0-DFF3, and inputted to one of the input terminals of the NOR gates Norb0-Norb3. As a result, the NOR gates Norb0-Norb3 are opened as NOT gates relative to the data output terminals OpD0-OpD3 of memory units MUa0-MUa3, and the output signals of memory units MUa0-MUa3, which are the input signals inputted to the other input terminal of the AND gates Ad0-Ad3 connected to the other input terminal, are inverted, and outputted. As a result of these operations, the signals that have inverted the data stored in memory units MUa0-MUa3 are outputted to the output terminals of memory cells Cel0-Cel3 at the timing when clock pulse Cp6 is outputted.

The signal NDi3 is inverted by the NOT gate Nt2, and outputted from output terminal OpDO. In this case, as the signal NDi3 is a signal that has inverted the level of the data DD3 stored in memory unit MUa3, the data DD3 is outputted from output terminal OpDO.

Next, after clock pulse Cp7 is outputted, the Read signal becomes low level, and the NOR gates Norb0-Norb3 are opened as NOT gates relative to negative data output terminals ON0-ON3 of DFF0-DFF3 as mentioned above. The fuse memory 13 then conducts the aforementioned type of shift register operations, and the signals NDi0, NDi1 and NDi2 (the inverted signals of the data DD0, DD1 and DD2) in output terminals OpNDi0, OpNDi1 and OpNDi2 of memory cells Cel0, Cel1 and Cel2 are sequentially outputted from output terminal OpDO via the NOT gate Nt2 in synchronization with clock pulses Cp7-Cp9. Consequently, the data DD1, DD2 and DD3 are outputted from output terminal OpDO.

Next, the operations for setting the offset value in the fuse memory 13 during preparation of the wafer of the geomagnetic sensor 1 in this embodiment are explained with reference to the flowchart shown in FIG. 7A.

First, the wafer in which the circuit of the geomagnetic sensor 1 has been formed is connected to a tester, and placed on a probe control device that has a contact probe. A coil for imparting magnetic field is attached to the bottom face of the pertinent chuck, the pertinent coil is controlled by the pertinent tester so that it generates the desired external magnetic field, and an external magnetic field is imparted to the pertinent wafer. The coil installed inside the geomagnetic sensor 1 is then contacted by the contact probe of the probe control device connected to the tester via the terminal on the wafer, the preset current flows, and the geomagnetic sensor 1 is heated to the desired temperature by the heat that is generated. Furthermore, the tester issues instructions to the control logic circuit 11 via the probe control device, and extracts the measurement values of the geomagnetic sensor 1 corresponding to the magnetic field imparted by the coil used for imparting a magnetic field.

In this embodiment, magnetic field and temperature conditions are varied, and a plurality of measurements are repetitively conducted to obtain measurement values at a plurality of desired magnetic fields and desired temperatures. Computations are then respectively conducted for the plurality of measurement values obtained at the plurality of magnetic field and temperature conditions, and the respective offset values are calculated (step Sa1). Specifically, measurement of sensor properties is repeatedly conducted while varying the temperature (or varying the magnetic field).

Next, the calculated offset values for magnetic sensitivity are stored in the fuse memory 13 (step Sa2). The operations for setting the offset values in the fuse memory 13 then terminate. As a result, the offset changes are stored according to the temperature changes of the geomagnetic sensor 1.

Next, the operations at times of actual use of the geomagnetic sensor 1 of this embodiment are explained.

First, the power source of the cell phone device in which the geomagnetic sensor is installed is turned on, and operation of the various parts commences. The operations of the geomagnetic sensor 1 are explained as follows with reference to the flowchart shown in FIG. 7B. The aforementioned offset values of the geomagnetic sensor circuit 12 are stored in the fuse memory 13 in the geomagnetic sensor 1.

First, with regard to the geomagnetic sensor, the control logic circuit 11 reads the offset value at the pertinent temperature from the fuse memory 13 (step Sb1). Next, measurement of the current ambient temperature is conducted (step Sb2) in order to conduct temperature compensation for the directional measurement data, and the magnetic sensitivity offset value corresponding to the pertinent temperature data is read. Next, the geomagnetic sensor circuit 12 conducts directional measurement (step Sb3). Next, the control logic circuit 11 reads the directional measurement data from the geomagnetic sensor circuit 11, and corrects the measurement value using the aforementioned offset value (step Sb4). Next, the map data is displayed on the display screen of the cell phone device based on the pertinent directional data. A return to step Sb2 then occurs, and the processing of steps Sb2-Sb4 is repeated.

As described above, this embodiment enables the control logic circuit 11 to set the offset correction value for correcting the offset of the magnetic sensitivity of the geomagnetic sensor circuit 12, which is generated by incorporation of the geomagnetic sensor 1 in the cell phone device, in the fuse memory 13. It further enables, at times of actual use of the geomagnetic sensor 1, the control logic circuit 11 to read the offset value of the geomagnetic sensor circuit 12 set in the fuse memory 13 from the fuse memory 13, and to correct the measurement value according to the pertinent value. As a result, it is possible to correct the variation in individual properties pertaining to the measurement values, and to seek improvement in the accuracy of the measurement values of the geomagnetic sensor.

Compared to the case where the offset values are stored in EEPROM as with conventional geomagnetic sensors, there is no need for a special process in manufacturing the chip, such as applying a thin oxide film like a tunnel insulation film to the memory unit, and laminating several polysilicon layers and metal layers for purposes of forming bit lines and word lines on the chip, and one can manufacture the chip while suppressing the unit price of the chip using an ordinary C-MOS process.

As there is no need for a high voltage generation circuit, a writing circuit and the like for purposes of writing, one can seek to reduce the scale of the memory drive system, decrease chip size, and lower the price.

By utilizing, for example, a polyside layer used in forming the gate electrodes of MOS-FET (Field Effect Transistor) in the chip, one can manage without increasing the wiring layer for the fuse by even one layer, and one can avoid effects from the entanglement of power source or ground lines as in cases where the fuse is formed by metal layers.

As the fuses FU0-Fu3 are formed by polyside, the resistance rate compared to metal is high, and one can form fuses that are cleanly cut by the heat generated by electrical conduction.

As a fuse memory is used for storage of the offset values, and as the pertinent offset values are stored by physically cutting fuses, one can eliminate any changes in the stored data of the pertinent offset values over time.

As it is sufficient to have capacity on the order of 32 bits for purposes of storing the offset values, a fuse memory facilitating creation of memory of small-capacity (from 4 to several hundred bits) is suitable for storage of the pertinent offset values.

As measurement of the data for calculating the offset values of the geomagnetic sensor 1 uses a tester used in the manufacturing process of the wafer, one can use other test equipment for IC products in combination with it. Chips for which severance (dicing) from the wafer has been conducted can be attached to a test jig furnished with a coil for imparting magnetic field, and the data can be measured by prober in a manner similar to the wafer.

Figure 7A:
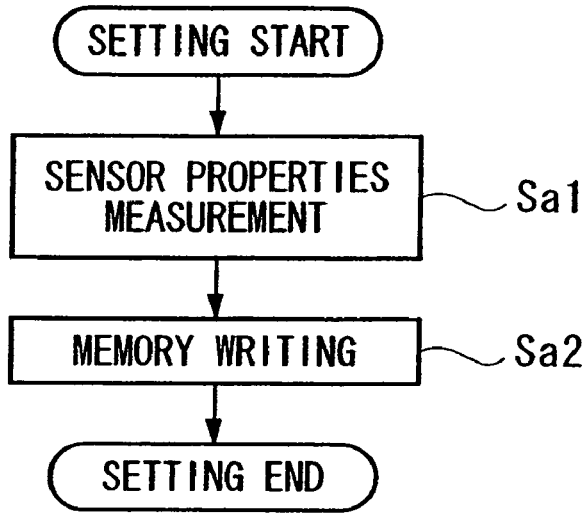
FIG. 7A is a flowchart that shows the operations for setting the offset value in the fuse memory 13 during preparation of the wafer of the geomagnetic sensor 1 in Embodiments 1-2 of the first set of inventions of this application.
Figure 8:
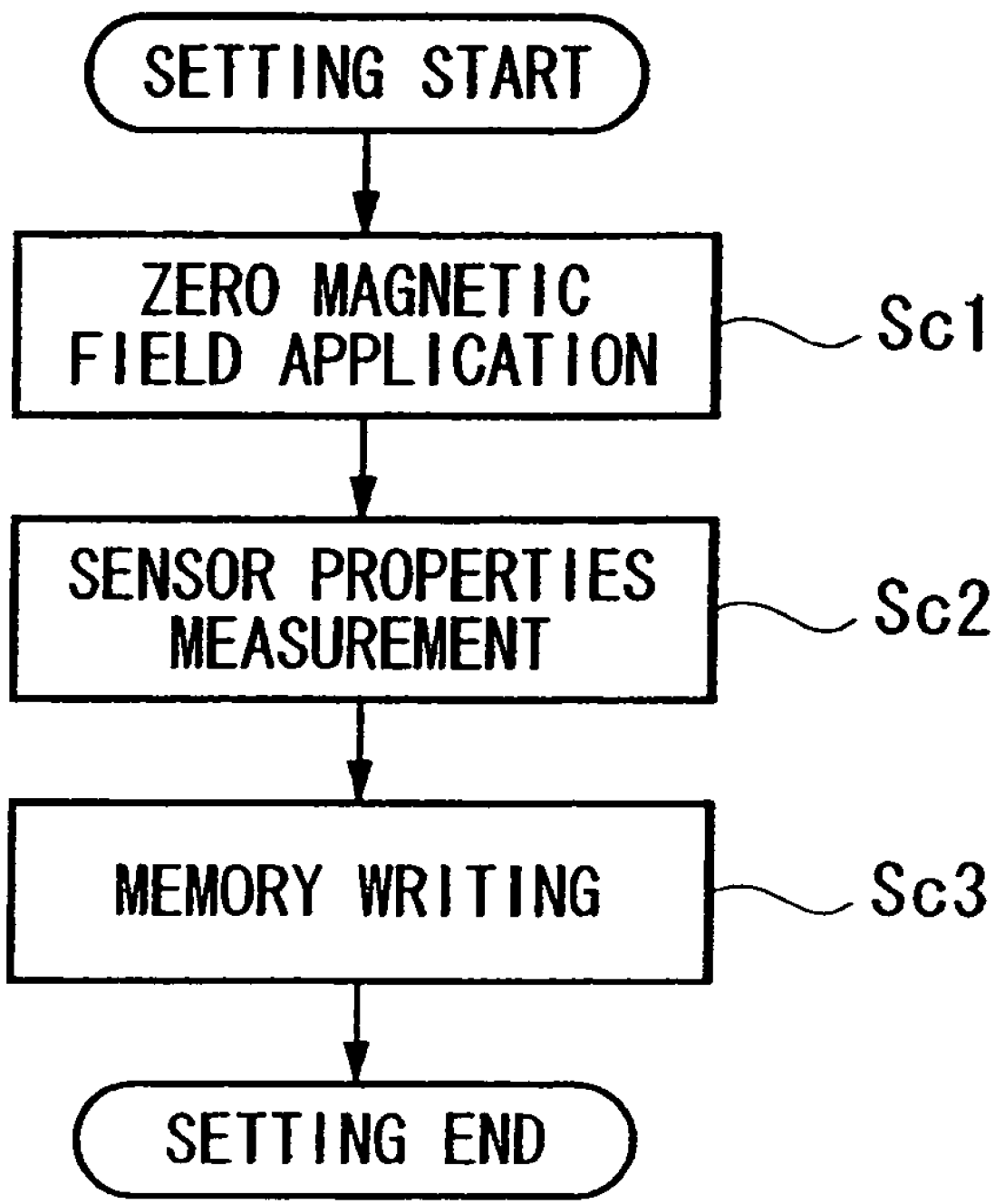
FIG. 8 is a flowchart that adds the step of imparting a zero magnetic field (Step Sc1) to the flowchart of FIG. 7.

As in the flowchart shown in FIG. 8, it is also acceptable to add the step (step Sc1) where the external magnetic field is set to a zero field by the aforementioned tester is set to the flowchart shown in FIG. 7A. In this case, step Sc2 corresponds to step Sa1, and step Sc3 to step Sa2. Moreover, using the output value when the external magnetic field has been set to a zero field as the standard value, one can also correct the properties of the measurement values of the geomagnetic sensor by comparing the pertinent standard value with the measurement values of the geomagnetic sensor. As a specific method for setting the external magnetic field to zero field by the tester, one may conceive of inducing a flow of current that generates a magnetic field in the direction of canceling the magnetic field that currently exists in the coil (the environmental magnetic field).

Next, an explanation is made regarding an embodiment of the first set of inventions and second set of inventions of this application.

The block configuration of the geomagnetic sensor 1 of this second embodiment is the same as the first embodiment, but the fact that the ratio of the offset change/temperature change is stored in the fuse memory 13 as a temperature coefficient of the offset differs from the first embodiment where the offset value itself is stored in the fuse memory 13. In this instance, when the pertinent temperature coefficient is calculated, the fact that one uses a temperature measured by the temperature sensor in the aforementioned physical quantity sensor differs from the first embodiment where the temperature is regulated by the electric current that flows in the internal coil.

This embodiment is explained below with reference to drawings.

In the manufacturing process, the temperature sensor in the geomagnetic sensor 1 reads the results of the measurement of properties relating to the ambient temperature from an internal temperature sensor circuit (not illustrated), obtains the initial value that corrects the measurement value of the temperature sensor circuit based on the pertinent results, obtains the correction value that corrects the sensitivity property of the temperature circuit based on the pertinent results, and stores it in the fuse memory 13. Moreover, the ratio of the offset change relative to the temperature corrected by the aforementioned initial value and correction value is calculated as the temperature coefficient of the offset, and is stored in the fuse memory 13.

The aforementioned temperature sensor circuit is configured from a common band gap reference circuit and an A/D converter. The band gap reference circuit consists of, for example, op amps, diodes and resistors. The A/D converter conducts A/D conversion of the output voltage of the band gap reference circuit, and outputs the output value Dout which is the result of the A/D conversion.

In the temperature sensor circuit, when the output value Dout is 600 when the ambient temperature T is 25° C., the output value Dout is as shown in the following formula (1).

$$Dout=-2(T-25)+600 \quad (1)$$

According to formula (1), when, for example, the ambient temperature T is 30° C., the output value Dout is 590.

The control logic circuit 11 reads the below-mentioned initial value $\Delta D$ and correction value $\Delta k$ from the fuse memory 13 together with the aforementioned temperature coefficient of the offset, corrects the measurement value of the temperature sensor circuit using the pertinent values, and calculates the offset from the pertinent measured temperature value and the temperature coefficient of the offset.

Figure 9:
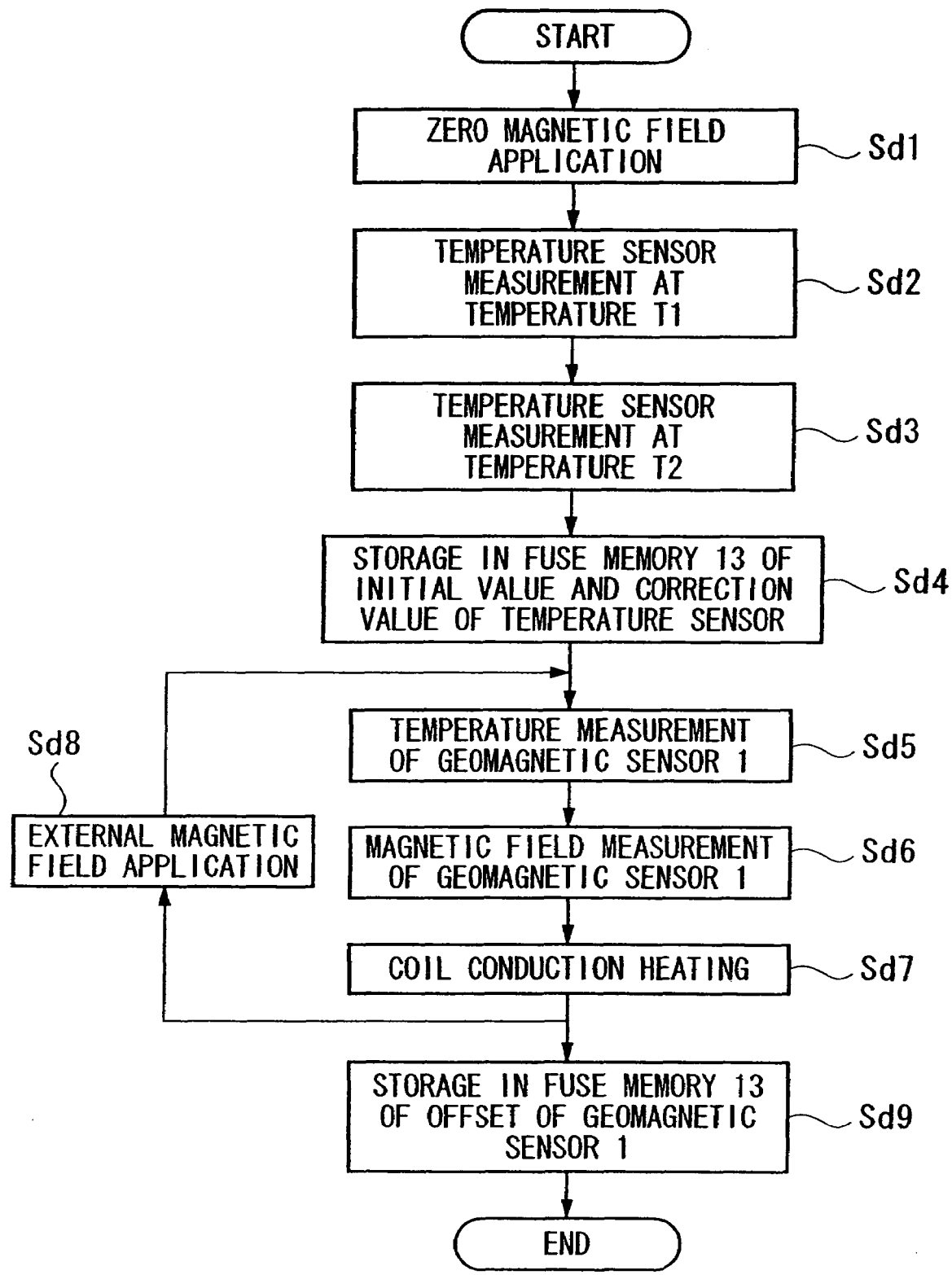
FIG. 9 is a flowchart that shows the operations for setting the offset value in the fuse memory 13 during preparation of the wafer of the geomagnetic sensor 1 in the second embodiment of the first set of inventions of this application.

Next, in the manufacturing process of the wafer of the geomagnetic sensor 1 in this embodiment, the operations for setting the aforementioned temperature coefficient of the offset as well as the aforementioned initial value $\Delta D$ and correction value $\Delta k$ pertaining to the internal temperature sensor in the fuse memory 13 are explained with reference to the flowchart shown in FIG. 9.

First, the wafer wherein the circuits of the geomagnetic sensor 1 are formed is placed on the chuck (the jig that secures the wafer). A heating coil is installed in the pertinent wafer, the pertinent coil is controlled so as to generate the desired heat by the tester connected to the pertinent chuck, and the pertinent wafer is heated.

Next, the external magnetic field is set to a zero field by the tester using the coil for imparting magnetic field (step Sd1), and sensor properties are measured by the following procedure.

That is, the aforementioned coil is controlled to temperature T1 by the tester. Next, the properties of the temperature sensor circuit are measured. The control logic circuit 11 then temporarily inputs the result to the memory inside the tester via the prober as output value D1' of output value Dout of the temperature sensor circuit relative to temperature T1 (step Sd2).

Next, the coil is controlled to temperature T2 by the tester, the properties of the temperature sensor circuit are measured, and the control logic circuit 11 then temporarily inputs the result to the memory inside the tester as output value D2' of output value Dout of the temperature sensor circuit relative to temperature T2 (step Sd3).

Next, using formula (1), the theoretical value D1 of the output value Dout relative to temperature T1 and the theoretical value D2 of the output value Dout relative to temperature T2 are calculated. Using output values D1', D2', theoretical value D1, temperatures T1, T2, and the temperature coefficient m (=-2) of formula (1), the initial value $\Delta D$ and correction value $\Delta k$ are calculated by the following computations.

That is, as shown in formula (2), the initial value $\Delta D$ is obtained by subtracting the theoretical value D1 from the output value D1'.

$$\Delta D = D1' - D1 \quad (2)$$

Using output values D1', D2', temperatures T1, T2, and the temperature coefficient m of formula (1), the correction value $\Delta k$ is then obtained by the computation shown in FIG. (3).

$$\Delta k = (D2' - D1')/[(T2-T1)m] \quad (3)$$

Next, the initial value $\Delta D$ and correction value $\Delta k$ are stored in the fuse memory 13 (step Sd4).

Next, the temperature of the geomagnetic sensor 1 is measured, and the temperature measured according to the aforementioned initial value $\Delta D$ and correction value $\Delta k$ is corrected (step Sd5). Next, the measurement value of the geomagnetic sensor 1 corresponding to a zero field is extracted (step Sd6). Next, a preset electric current is made to flow in the coil provided inside the geomagnetic sensor 1, the geomagnetic sensor 1 is heated to the desired temperature by this heat generation, and the temperature of the geomagnetic sensor 1 is changed (step Sd7).

Next, the preset external magnetic field is imparted to geomagnetic sensor 1 by the coil for imparting magnetic field. (step Sd8). A return to step Sd5 then ensues, and the processing of the above steps Sd5-Sd8 is repeated.

One can establish the settings so that in the case where the temperature correction values of the geomagnetic sensor 1 possess element properties that vary according to the intensity of the external magnetic field, an external magnetic field is imparted in this step Sd8, while in the case where the temperature correction values of the geomagnetic sensor 1 possess element properties that are not affected by the intensity of the external magnetic field, step Sd8 is skipped, and there is advancement to step Sd5.

When the processing of steps Sd5-Sd8 is conducted to a preset frequency, the shift to step Sd8 does not occur after the processing of step Sd7, and a shift to step Sd9 occurs. That is, the offset value is calculated from the measurement value of the geomagnetic sensor 1, the temperature coefficient of the offset value constituting the ratio of offset value change/temperature sensor change is calculated, and they are stored in the fuse memory 13 (step Sd9). The operations for setting the temperature coefficient of the offset value in the fuse memory 13 then terminate. As a result, the temperature coefficient of the offset value of the geomagnetic sensor 1 is stored in memory.

Figure 7B:
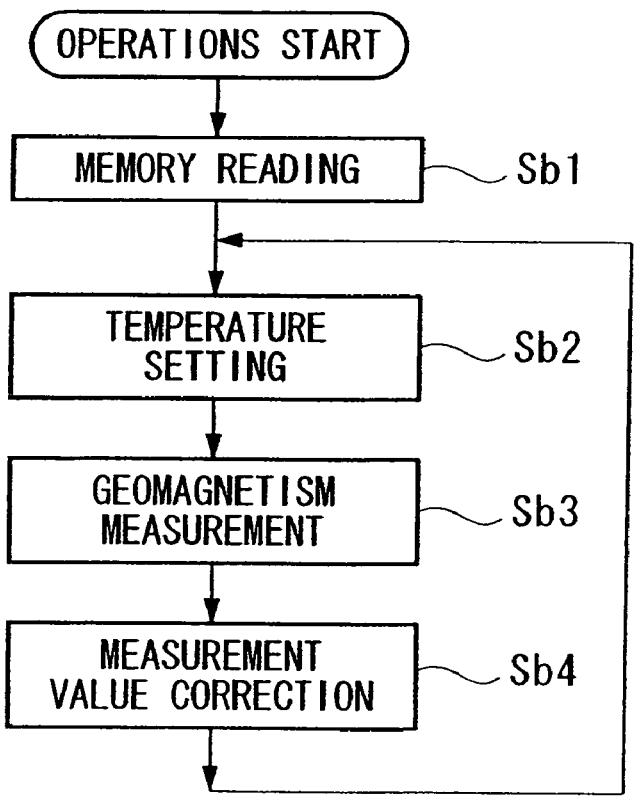
FIG. 7B is a flowchart that shows the operations during actual use of the geomagnetic sensor 1 in Embodiments 1-2 of these same inventions.

Next, the operations at times of actual use of the geomagnetic sensor 1 of this embodiment are explained with reference to the flowchart shown in FIG. 7B. As the operations at times of actual use of the geomagnetic sensor 1 in this embodiment are similar to the operations of the geomagnetic sensor 1 in the first embodiment, only the points of difference are explained.

First, in the geomagnetic sensor 1, the control logic circuit 11 reads the temperature coefficient of the offset at the pertinent temperature from the fuse memory 13 (step Sb1). Next, measurement of the current ambient temperature is conducted (step Sb2) in order to conduct temperature compensation for the directional measurement data, and the offset value corresponding to the pertinent temperature is calculated from the value resulting from temperature correction of the temperature sensor and the temperature coefficient of the offset.

At this time, the control logic circuit 11 reads the aforementioned initial value ΔD and correction value from the fuse memory 13. Using this, it outputs the temperature output value Tout (step Sb3), which is the value that converts the output value Dout outputted from the temperature sensor to temperature by the following type of computation, and conducts correction of the temperature sensor.

That is, using the measurement value D, theoretical value D1, initial value ΔD, correction value Δk, and the temperature coefficient m of formula (1), the temperature output value Tout is obtained by the computation shown in formula (4).

$$Tout=[D-(D1+\Delta D)]\times[1/(\Delta k\times m)]+T1(° C.) \qquad (4)$$

In the case where the operations for setting the initial value ΔD and correction value Δk in the fuse memory 13 are conducted for a temperature T1 of 25° C., T1 in formula (4) is 25° C. (D1=600).

Next, the geomagnetic sensor circuit 12 conducts directional measurement (step Sb3). Next, the control logic circuit 11 reads the directional measurement data from the geomagnetic circuit 12, and corrects the measurement value using the offset value pertaining to the aforementioned post-correction temperature output value Tout (step Sb4). Next, based the pertinent directional data, the map data is displayed on the display screen of the cell phone device. A return to step Sb2 then ensues, and the processing of steps Sb2-Sb4 is repeated.

As described above, this embodiment enables the control logic circuit 11 to set the initial value ΔD and correction value Δk of the temperature sensor circuit inside the temperature sensor in the fuse memory 13 during the manufacturing process of the temperature sensor inside the geomagnetic sensor 1. It further enables the control logic circuit 11 to calculate the ratio of the offset change relative to the temperature corrected by the aforementioned initial value and correction value as the temperature coefficient of the offset, and to store it in the fuse memory 13. At times of actual use of the temperature sensor, it is also possible for the control logic circuit 11 to read the initial value ΔD and correction value Δk as well as the temperature coefficient of the offset of the temperature sensor circuit set in the fuse memory 13 from the fuse memory 13, to output the temperature output value Tout, and to correct the offset of the geomagnetic sensor 1 according to the pertinent values. As a result, it is possible to reduce the number of numerical values to be stored in memory.

With regard to memory for temporarily storing data for calculation of the initial value ΔD and correction value Δk of the temperature sensor in the geomagnetic sensor 1, in addition to the memory inside the tester, if it is possible to form a cache memory or a separate fuse memory consisting of DRAM, SRAM or the like on the chip of the geomagnetic sensor 1, and to temporarily store the aforementioned data therein, it is acceptable to use such memory.

With regard to measurement of the data for calculating the initial value ΔD and correction value Δk of the temperature sensor in the geomagnetic sensor 1, as a heatable chuck attached to the tester used in the manufacturing process of the wafer is used, it is possible to make combined use of other equipment for LSI testers. It is also possible to attach a chip that has undergone severance (dicing) from the wafer to a test jig provided with a heater for heating, and to measure the output value with a prober in the same way as the wafer.

Next, the third embodiment of the first set of inventions of this application is explained.

The block configuration of the geomagnetic sensor of this third embodiment is identical to FIG. 1, but when causing variation of both the temperature and the magnetic field during preparation of the geomagnetic sensor 1, the fact that high-precision temperature control is conducted by obtaining in advance the sensitivity property of the temperature sensor for each wafer-mounted chip, and by additionally measuring the actual temperature by the pertinent temperature sensor, and conducting feedback is a point of difference with the first embodiment where temperature monitoring is not conducted by the temperature sensor in the geomagnetic sensor 1. This embodiment is explained below with reference to the flowchart shown in FIG. 7A. As the operations in the manufacturing process of the geomagnetic sensor 1 in this embodiment are similar to the operations in preparing the geomagnetic sensor 1 in the first embodiment, an explanation is made focusing on the points of difference.

Specifically, in step Sa1, the sensitivity property of the temperature sensor for each wafer-mounted chip is obtained in advance, and stored in the memory of the tester. At this time, an address is assigned to the position of the chip, and this sensitivity property and this address information are stored in the memory of the tester as the temperature sensor property for each address.

Next, using the probe control device endowed with a temperature adjustment function, the coil in the geomagnetic sensor 1 is energized and heated in the same manner as the first embodiment to reach the desired temperature. The measured temperature inside the sensor chip is monitored (measured) by the temperature sensor in the geomagnetic sensor 1. In this case, the temperature sensor property information is read based on the address information stored in the tester, the measured temperature in the chip is corrected using this, and an accurate temperature is calculated. In the case where this temperature (measurement value) and the prescribed temperature (theoretical value) are compared and found to differ, the temperature of the temperature sensor is adjusted by the temperature adjustment function of the probe control device.

In accordance with the above operations, the geomagnetic sensor 1 is heated to the desired temperature. Furthermore, the tester issues instructions to the control logic circuit 11 via the probe control device, and extracts the measurement values of the geomagnetic sensor 1 according to the external magnetic field imparted by the coil for imparting magnetic field. In this embodiment, the magnetic field and temperature conditions are made to vary, a plurality of measurements are repetitively conducted, and measurement values are obtained at a plurality of desired magnetic fields and desired temperatures. Computations are then respectively conducted for the plurality of measurement values obtained at the plurality of magnetic field and temperature conditions, and the respective offset values are calculated.

Next, the temperature sensor property information for each wafer-mounted chip and the calculated offset values are stored in the fuse memory 13 in step Sa2. The operations for setting the offset values in the fuse memory 13 then terminate. As a result, the offset changes are stored according to the temperature changes of the geomagnetic sensor 1.

In accordance with the foregoing embodiment, as described above, when both the temperature and the external magnetic field are made to vary, high-precision temperature control is conducted by obtaining in advance the sensitivity property of the temperature sensor for each wafer-mounted chip, and by additionally measuring the actual temperature by the temperature sensor, and conducting feedback, and it is possible to accurately extract the offset values according to temperature.

In this embodiment, as well, it is possible to cause both the temperature conditions and the external magnetic field conditions to vary. For example, the temperature may be changed to the two points of 25° C. and 35° C., and measurement respectively conducted at a plurality of magnetic field conditions to calculate the offset values.

In this case, it is efficient to fix the temperature, and cause variations in the magnetic field, but it is also acceptable to fix the magnetic field, and cause variations in the temperature alone in preference. It is also acceptable to conduct random measurements.

As a modified example of this embodiment, as with the second embodiment, one may also store the temperature coefficients of the offset and the sensitivity properties in the fuse memory 13. In this case, the sensitivity properties for each address temporarily stored in the memory of the tester are inputted to the fuse memory of the chip according to the pertinent address. By this means, after separation into the individual chips, it is possible to correct the temperature sensor from the sensitivity variations (initial values $\Delta D$) and temperature coefficients of the offset ($\Delta k$) of each temperature sensor.

Embodiments of this invention are explained in detail above with reference to drawings, but the specific configuration is not limited to these embodiments, and design modifications are also included within a scope that does not deviate from the essentials of this invention.

For example, with regard to writing to the fuse element, in addition to electrical conduction, it may also be conducted by cut-off by irradiation from the outside such as with laser, FIB, and electron beam. In addition, even if the fuse element is not subjected to physical cutting, it is also acceptable to use any means that enables raising the resistance value to a state where one may judge that cut-off has substantially occurred. Moreover, as with an anti-fuse, it is also acceptable to have a memory that utilizes the lowering of resistance of a high-resistance state (or insulated state) to bring about satisfactory electrical conduction.

One embodiment of the second set of inventions of this application is explained below with reference to drawings.

Figure 10:
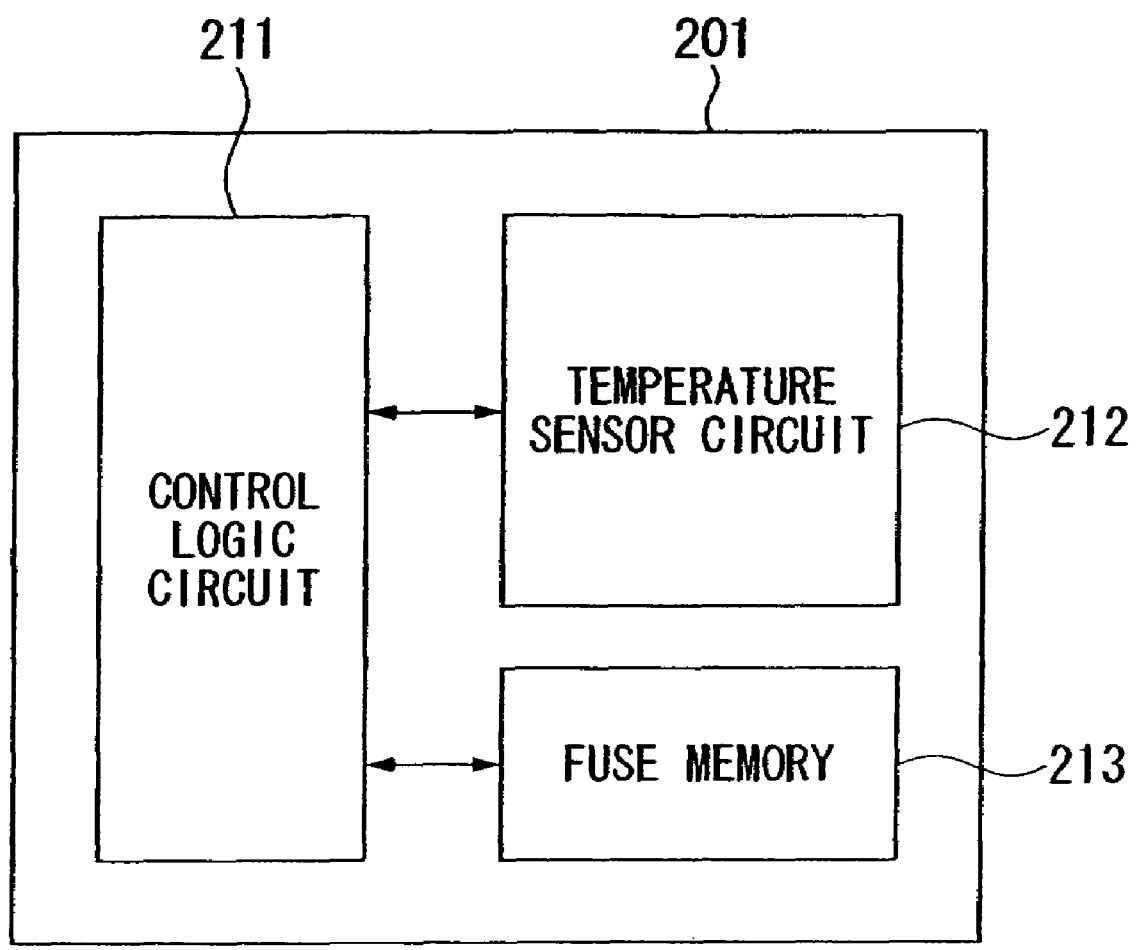
FIG. 10 is a drawing that shows the configuration of the temperature sensor 201 in one embodiment of the second set of inventions of this application.

As shown in FIG. 10, the temperature sensor 201 is configured on one chip from the control logic circuit 211 (correction data writing means) (correction data reading means) (correction means) (control means) for conducting control of the temperature sensor 201, the temperature sensor circuit 212 (temperature detection means), and the fuse memory 213.

The control logic circuit 211 reads the results of measurement of the properties pertaining to the ambient temperature from the temperature sensor circuit 212 in the manufacturing process of the temperature sensor 201, obtains the initial value that corrects the measurement value of the temperature sensor circuit 212 based on the pertinent results, obtains the correction value that corrects the sensitivity property of the temperature sensor circuit 212 based on the pertinent results, and stores this initial value and this correction value in the fuse memory 213. As described below, the control logic circuit 211 reads the initial value $\Delta D$ and correction value $\Delta k$ from the fuse memory 213, and corrects the measurement value from the temperature sensor circuit 212 using the pertinent values. The temperature sensor circuit is identical to a conventional one.

The fuse memory 213 possesses a plurality of fuses (memory units), imparts overcurrent pulses to the fuse provided at the internal intersection of the word line and bit line according to certain specific input pulses from the control logic circuit 211 to bring about fusion, and thereby writes the data into the pertinent intersection. Overcurrent pulses are selectively imparted to the various fuses, and there exist fuses that have been electrically cut and fuses for which electrical connection has been maintained, with the result that data of the prescribed number of bits is stored. In response to other input signals from the control logic circuit 211 and in accordance with the state of cut-off of the fuse at the intersection of the pertinent word line and bit line, the data written at the pertinent intersection is read, and outputted to the control logic circuit 211.

Figure 11A:
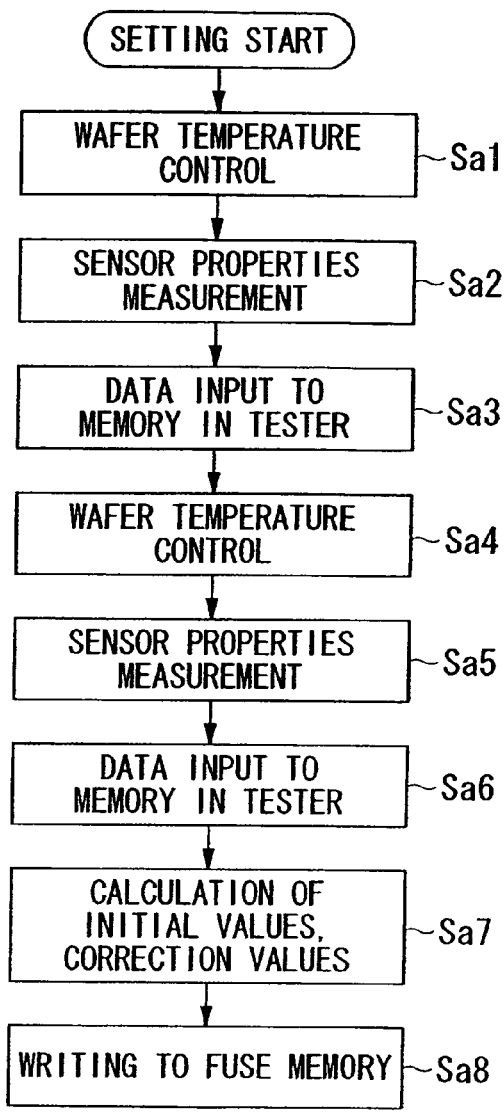
FIG. 11A is a flowchart that shows the operations for setting the initial value ΔD and the correction value Δk in the fuse memory 213 during preparation of the temperature sensor 201 and the operations during actual use of the temperature sensor 201 in this same embodiment.

Next, the operations for setting the initial value $\Delta D$ and correction value $\Delta k$ in the fuse memory 213 in the manufacturing process of the temperature sensor 201 of this embodiment are explained with reference to the flowchart shown in FIG. 11A.

First, the wafer in which the circuit of the temperature sensor 201 is formed is placed on the chuck (the jig that secures the wafer). A heating coil is attached to the bottom face of the pertinent chuck, the pertinent coil is controlled so as to generate the desired heat by the tester connected to the pertinent chuck, and the pertinent wafer is heated. Next, the sensor properties are measured by the following procedure (step Sa1).

That is, the heater is controlled to temperature T1 (the first temperature) by the tester (step Sa1). Next, measurement of the properties of the temperature sensor circuit 212 is conducted (step Sa2). The control logic circuit 211 then temporarily inputs the result to the memory inside the tester via the prober as output value D1' (the measurement value pertaining to the first temperature) of output value Dout of the temperature sensor circuit 212 relative to temperature T1 (step Sa3). Next, the heater is controlled to temperature T2 (the second temperature) by the tester (step Sa4), and the properties of the temperature sensor circuit 212 are measured (step Sa5). The control logic circuit 211 then temporarily inputs the result to the memory inside the tester as output value D2' (the measurement value pertaining to the first temperature) of output value Dout of the temperature sensor circuit 212 relative to temperature T2 (step Sa6).

Next, using the aforementioned formula (21), the theoretical value D1 (the theoretical value pertaining to the first temperature) of the output value Dout relative to temperature T1 and the theoretical value D2 of the output value Dout relative to temperature T2 are calculated. Using output values D1', D2', theoretical value D1, temperatures T1, T2, and the temperature coefficient m (=−2) of formula (21), the initial value $\Delta D$ and correction value $\Delta k$ are calculated by the following computations (step Sa7).

That is, as shown in formula (22), the initial value $\Delta D$ is obtained by subtracting the theoretical value D1 from the output value D1'.

$$\Delta D = D1' - D1 \tag{22}$$

Using output values D1', D2', temperatures T1, T2, and the temperature coefficient m of formula (21), the correction value Δk is obtained by the computation shown in FIG. (23).

$$\Delta k=(D2'-D1')/[(T2-T1) \, m] \quad (23)$$

Next, the initial value ΔD and correction value Δk are stored in the fuse memory 213 (step Sa8). The operations for setting the initial value ΔD and correction value Δk in the fuse memory 213 then terminate.

Next, the operations at times of actual use of the temperature sensor 201 of this embodiment are explained. In this embodiment, the temperature sensor 201 is installed in the cell phone device together with the geomagnetic sensor for conducting directional measurement operations, is used for extracting the ambient temperature data used in temperature compensation of the pertinent geomagnetic sensor as the physical quantity sensor ancillary to the pertinent geomagnetic sensor, and operates according to the instructions of the pertinent geomagnetic sensor only in the case where temperature compensation of the pertinent geomagnetic sensor is required.

Figure 11B:
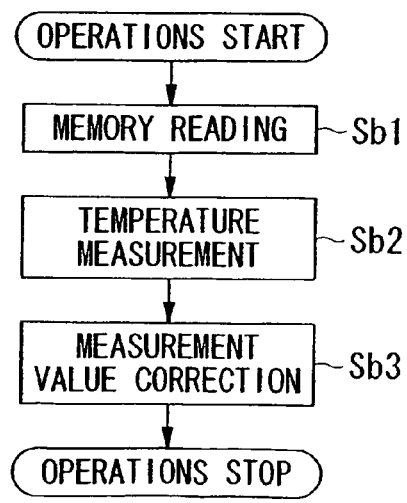
FIG. 11B is a flowchart that shows the operations during actual use of the temperature sensor 201 in this same embodiment.
Figure 12:
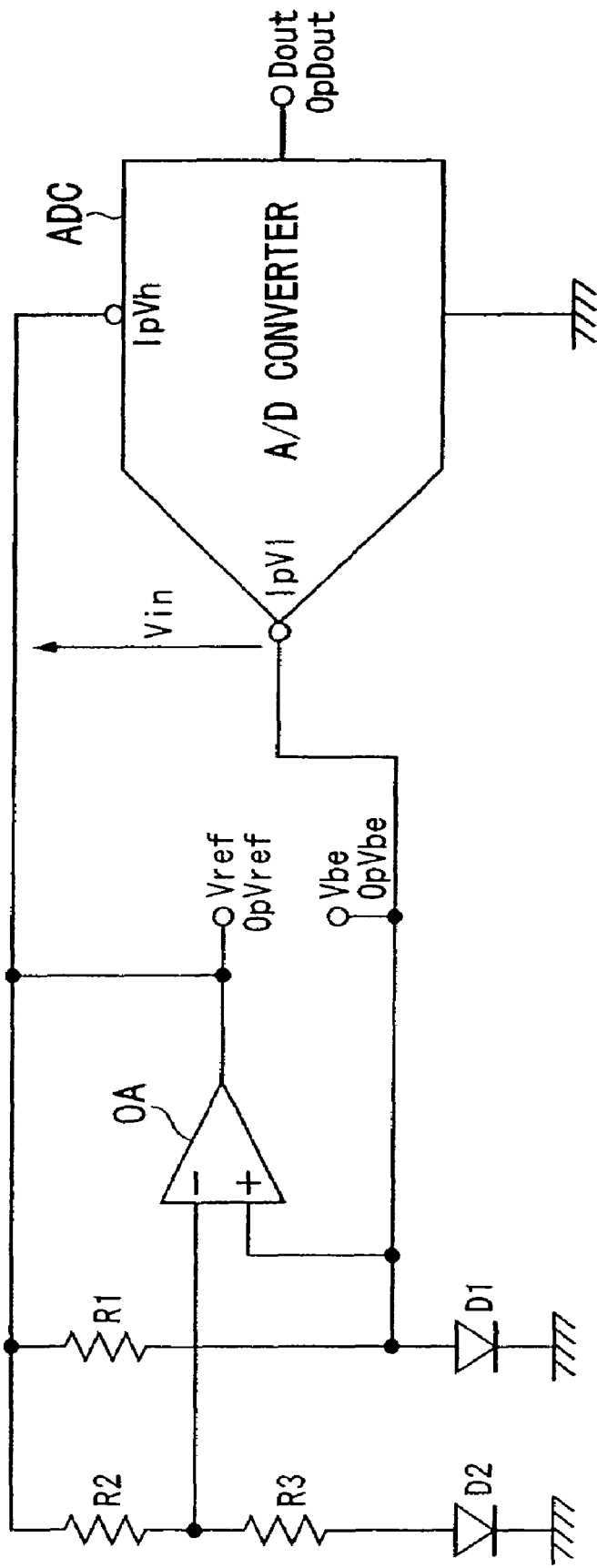
FIG. 12 is a block diagram that shows the configuration of the temperature sensor circuit 212 in a conventional case and in this same embodiment.

First, the power source of the cell phone device in which the temperature sensor 201 and the geomagnetic sensor are installed is turned on, and operation of the various parts commences. The operations of the temperature sensor 201 are explained as follows with reference to the flowchart shown in FIG. 11B. The aforementioned initial value ΔD and correction value Δk of the temperature sensor circuit 212 are stored in the fuse memory 213 in the temperature sensor 201.

First, the geomagnetic sensor instructs the temperature sensor 201 to measure the current ambient temperature in order to conduct temperature compensation of the directional measurement data during the process of measuring direction. The control logic circuit 211 then reads the initial value ΔD and correction value Δk from the fuse memory 213 (step Sb1). Next, the temperature sensor circuit 212 conducts temperature measurement (step Sb2). Next, the control logic circuit 211 reads the output value Dout from the temperature sensor circuit 212 as the temperature measurement data, and outputs the temperature output value Tout, which is the value that converts the output value Dout to temperature using the aforementioned initial value ΔD and correction value Δk according to the following computation (step Sb3).

That is, using the measurement value D, theoretical value D1, initial value ΔD, correction value Δk, and the temperature coefficient m of formula (21), the temperature output value Tout is obtained by the computation shown in formula (24).

$$Tout=[D-(D1+\Delta D)]\times[1/(\Delta k\times m)]+T1 (° C.) \quad (24)$$

In the case where the operations for setting the initial value ΔD and correction value Δk in the fuse memory 213 are conducted for a temperature T1 of 25° C., T1 in formula (24) is 25° C.

The outputted temperature output value Tout is then outputted to the geomagnetic sensor, temperature compensation of the directional data is conducted, and the map data is displayed on the display screen of the cell phone device based on the pertinent directional data. The operations of the temperature sensor 201 then terminate.

As described above, this embodiment enables the control logic circuit 211 to set the initial value ΔD and correction value Δk of the temperature sensor circuit 212 in the fuse memory 213 during the manufacturing process of the temperature sensor 201. At times of actual use of the temperature sensor 201, it further enables control logic circuit 11 to read the initial value ΔD and correction value Δk of the temperature sensor circuit 212 set in the fuse memory 213 from the fuse memory 213, and to output the temperature output value Tout according to the pertinent value. As a result, it is possible to correct the individual variations pertaining to the measurement values, and to strive for improvement in the accuracy of the measurement values of the temperature sensor.

In this embodiment, instead of thermistors or thermocouples, diodes are used as the temperature detection elements of the temperature sensor circuit 212, and the fuses are formed of polyside (polysilicon), with the result that the chip of the temperature sensor 201 can be manufactured by the ordinary CMOS process without newly providing metal wiring layers, and that cost increases can be avoided without complicating the manufacturing process of the temperature sensor 201.

As a fuse memory is used for storage of the initial value ΔD and correction value Δk, and as the initial value ΔD and correction value Δk are stored in memory by physically cutting the fuse, it is possible to eliminate changes to the pertinent values.

As it is sufficient to have capacity on the order of 32 bits for purposes of storing the initial value ΔD and correction value Δk, a fuse memory facilitating the creation of a small-capacity (4 to several hundred bits) memory is suitable for storage of the pertinent values.

In this embodiment, with regard to the temperature sensor used in combination with the geomagnetic sensor, as two types of metal are used in the geomagnetic sensor, it is acceptable to use a thermocouple formed from the pertinent two types of metal as the temperature detection element.

In this embodiment, it is assumed that the temperature sensor 201 is used in temperature compensation of the geomagnetic sensor installed in the cell phone device, but its application is not limited to this, and the temperature sensor 201 may also be used in electronic equipment requiring temperature compensation.

The memory that serves to temporarily store the data for calculation of the initial value ΔD and correction value Δk of the temperature sensor 201 is not limited to memory inside the tester, and if it is possible to form a DRAM cache memory or another fuse memory on the chip of the temperature sensor 201 and to temporarily store the aforementioned data therein, such memories may also be used.

As measurement of the data for calculation of the initial value ΔD and correction value Δk of the temperature sensor 201 uses a chuck used in the manufacturing process of the wafer, it is possible to make combined use of other equipment for testers. Moreover, chips that have undergone severance (dicing) from the wafer may be attached to a test jig provided with a heater for heating, and output values may be measured with a prober in the same way as the wafer.

An embodiment of this invention has been explained in detail above with reference to drawings, but the specific configuration is not limited to this embodiment, and design modifications are also included within a scope that does not deviate from the essentials of this invention.

An embodiment of this invention is explained below using drawings.

Figure 13:
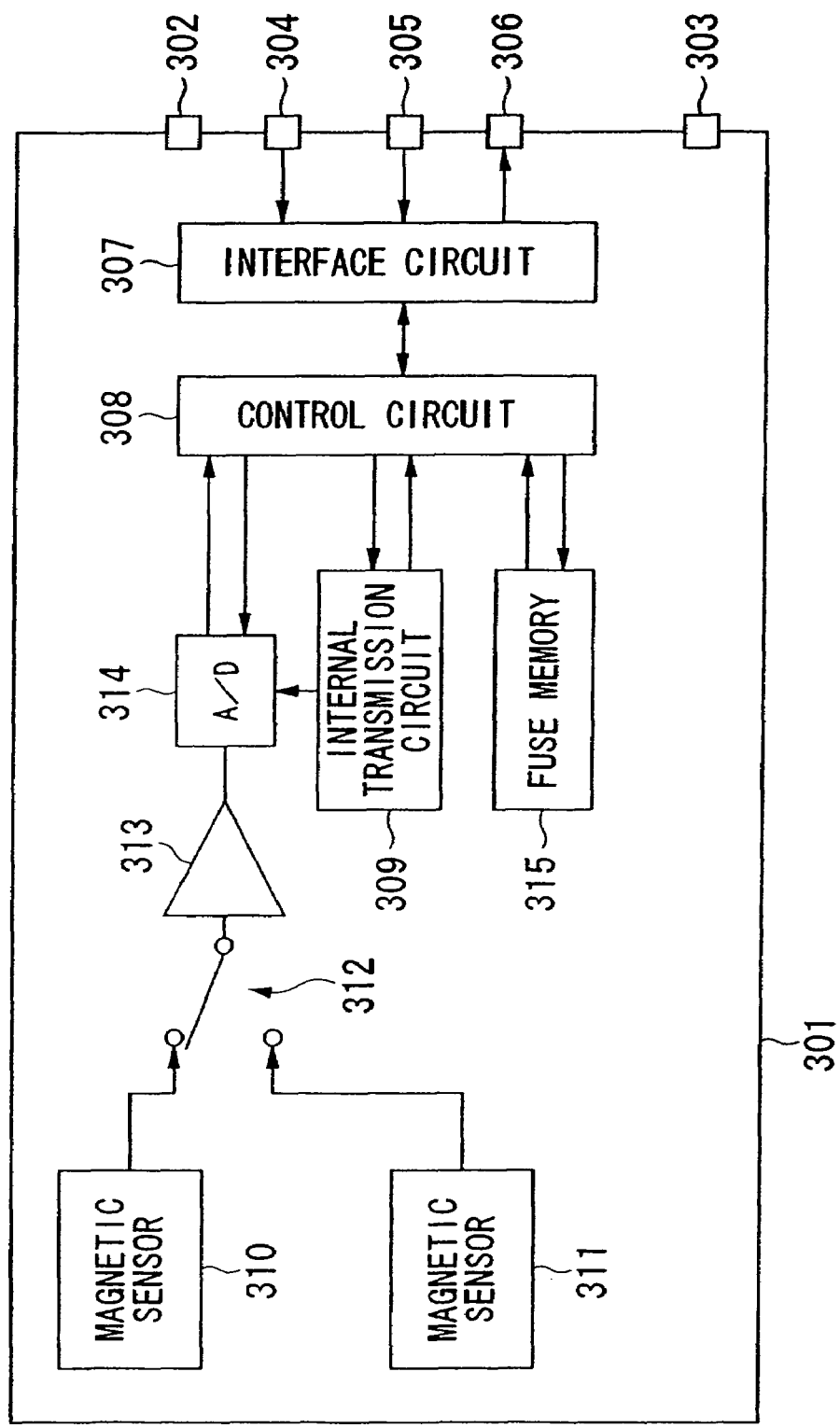
FIG. 13 is a block diagram that shows a schematic configuration of the LSI for geomagnetism detection pertaining to the first embodiment of the third set of inventions of this application.

FIG. 13 is a block diagram showing an outline of the configuration of the LSI for geomagnetism detection pertaining to the first embodiment of the third set of inventions of this application.

As shown in this same drawing, the LSI 301 possesses the power source terminal 302, ground terminal 303, chip select input terminal 304, data input terminal 305, and data output terminal 306. Wiring of the power source lines and ground lines to the respective parts is omitted from the drawing.

The interface circuit 307 conducts transmission and receipt of the chip select signals and input/output signals vis-à-vis the master chip, which is not illustrated. The control circuit 308 operates according to prescribed logic based on the instructions from the master chip, and conducts control of the various parts. The internal oscillator circuit 309 emits clock pulses to the control circuit 308 and the other circuits.

The X-axis direction magnetic sensor 310 and the Y-axis direction magnetic sensor 311 are magnetic sensors that use magnetic resistance elements and the like. The changeover circuit 312 operates according to the control of the control circuit 308, and alternately switches output of the detection outputs of the magnetic sensors 310 and 311 to the input terminal of the amplifier 313. The amplifier 313 amplifies the detection outputs of the magnetic sensors 310 and 311, and transmits them to the A/D conversion circuit 314. The A/D conversion circuit 314 digitalizes the detection outputs, and outputs them to the control circuit 308.

The fuse memory 315 is a memory equivalent to a nonvolatile memory element of the thermal metamorphic type for the storage of correction data of detection outputs measured at the time of shipment inspection and other data, and it stores as correction data of the detection outputs either (a) the value of D1 to D3; (b) the value of D3; (c) the values of D1, D2 and D4; or (d) the value of D4. The correction data D1-D4 are expressed in the following formulas (304)-(307).

$$D1 = a12/a11 \quad (304)$$

$$D2 = a21/a11 \quad (305)$$

$$D3 = a22/a11 \quad (306)$$

$$D4 = a22/a11 - 1 \quad (307)$$

Provided that aij (i=1 or 2, j=1 or 2) are the below-mentioned correction coefficients.

Figure 14:
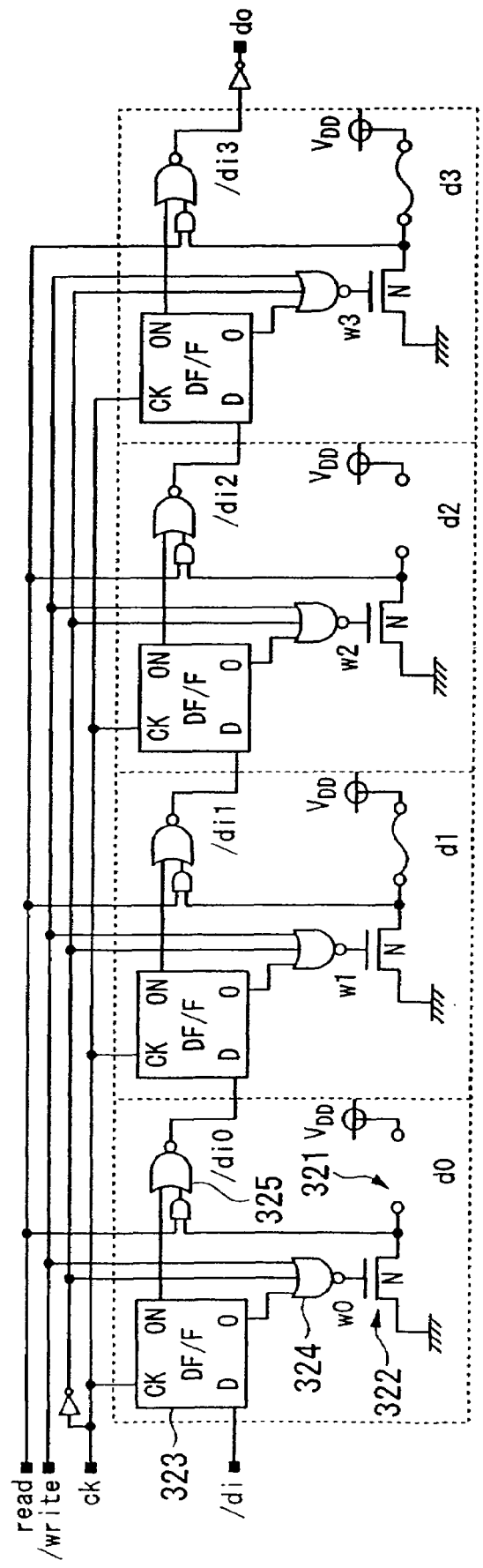
FIG. 14 is a block diagram that shows an example of fuse memory configuration.

FIG. 14 is a block diagram showing an example of fuse memory configuration. This drawing shows an example where four memory cells d0-d3 are connected in a daisy chain (linked in a row) to configure a 4-bit scan pass. By means of this configuration, the correction data of the detection output can be stored as information of 4 bits.

In each memory cell d0-d3, 321 is the fuse consisting of polysilicon resistance or the like, 322 is the N-type FET (Field Effect Transistor), 323 is the data flip-flop circuit, 324 is the triple input NOR gate that emits gate voltage to the FET 322, and 325 is the logic gate configured from a double input AND gate and double input NOR gate that output the outputs data to the next memory cell connected in the daisy chain. An explanation is given below regarding the configuration of memory cell d0, but the other memory cells d1-d3 share this configuration.

The data to be written into the memory cell is inputted to the data input terminal D of the data flip-flop circuit 323, and the clock pulse ck is supplied to the CK terminal. Output data is supplied to one of the input terminals of the NOR gate 324 from the positive output terminal 0 of the data flip-flop circuit 323, the inverting signal of the clock pulse ck is supplied to another input terminal, and the inverting signal /WRITE of the writing signal is supplied to still another input terminal.

The output terminal of the NOR gate 324 is connected to the gate of the FET 322, and its drain is connected, and constitutes the ground level. One end of the fuse 321 is connected to the power source voltage VDD, and the other end is connected to the source of the FET 322.

One of the input terminals of the AND gate that configures the logic gate 325 is supplied with the reading signal READ, while the other input terminal is connected to the source of the FET 322. One of the input terminals of the NOR gate that configures the logic gate 325 is supplied with the output data from the negative output terminal ON of the data flip-flop circuit 323, while the other input terminal is connected to the output terminal of the AND gate that configures the logic gate 325. The output of the logic gate 325 is then supplied to the data input terminal D of the data flip-flop circuit 323 of the next memory cell d1 connected in the daisy chain.

When the READ signal is supplied at low level (low active) and the /WRITE signal at high level (low active), each memory cell is initialized in advance.

When writing to memory cell d0 is conducted, a bit for writing is sent from input terminal /di of memory cell d0, and /WRITE is supplied to the NOR gate 324 as low level at the timing where this bit is sent to the desired cell. As a result, the output W0 of the NOR gate 324 becomes high level, the FET 322 is turned on, and the fuse 321 is energized, and fused. As an example, the situation illustrated in FIG. 14 shows that data is written into memory cells d0 and d2, and that the respective fuses 21 are fused. That is, it shows that the data "1" (low level) is stored in memory cell do, the data "0" (high level) is stored in memory cell d1, the data "1" (low level) is stored in memory cell d2, and the data "0" (high level) is stored in memory cell d3.

When data is read from each memory cell, after resetting the data flip-flop 323, the existence or non-existence of cutting in the fuse 321 is reflected in the output of the logic gate 325 by setting READ to high level. Scan-out operations are conducted in this state, and the output of each cell, and inverted outputs of the output of each cell are extracted from output terminal d0 via the logic gate 325 of the final memory cell d3.

If explanation is made by returning to FIG. 13, the changeover circuit 313 is controlled, and the detection outputs Sx and Sy of the magnetic sensors 310 and 311 are inputted to the A/D conversion circuit 314. After digitalization of the detection outputs Sx and Sy by this A/D conversion circuit 314, they are inputted to internal register (not illustrated) of the control circuit 308. Correction data is then read from the fuse memory 315, and the detection outputs Sx and Sy are corrected, after which they are outputted to the interface circuit 307.

The correction relative to the detection outputs Sx and Sy may also be conducted in the following manner, instead of being conducted by the control circuit 308. That is, the LSI is provided with a function for outputting the data stored in the fuse memory, and Sx and Sy are outputted from the LSI prior to correction. On the master side, Sx and Sy are corrected by software processing based on the separately received data of the fuse memory.

Next, an explanation is made regarding the correction processing of the detection outputs Sx and Sy. First, with regard to the detection outputs Sx and Sy and the magnetic fields Hx and Hy of the magnetic sensors 310 and 311, there is the relation shown in formula (308).

(Number 1)

$$\begin{bmatrix} Hx \\ Hy \end{bmatrix} = \begin{bmatrix} a11 & a12 \\ a21 & a22 \end{bmatrix} \begin{bmatrix} Sx \\ Sy \end{bmatrix} \quad (308)$$

Provided that aij (i=1 or 2, j=1 or 2) are correction coefficients, a11 is the X-axis sensitivity correction coefficient (=1/X axis sensitivity), a22 is the Y-axis sensitivity correction coefficient (=1/Y axis sensitivity), and a12 and a21 are interaxial correction coefficients.

With an ideal magnetic sensor, a11=a22 and a12=a21, but with actual magnetic sensors, a11≠a22 and a12≠a21, and this correction processing is therefore necessary. In the first embodiment, correction processing is conducted based on any of the following correction computation methods A-D.

(Computation Method A)

When considering the properties of a geomagnetic sensor, there is no need to obtain an absolute value for the magnetic field in order to measure direction, and it is only necessary to have ratios for each component of the magnetic field. Consequently, if one obtains the three values of a12/a11, a21/a11 and a22/a11, it is sufficient for correction computation in applications pertaining to a geomagnetic sensor.

Thus, in computation method A, correction processing is conducted by formula (309) using the values of correction data D1-D3 stored in the fuse memory.

(Number 2)

$$\begin{bmatrix} Sx' \\ Sy' \end{bmatrix} = \begin{bmatrix} 1 & D_1 \\ D_2 & D_3 \end{bmatrix} \begin{bmatrix} Sx \\ Sy \end{bmatrix} \quad (309)$$

Provided that Sx' and Sy' are the post-correction detection outputs.

According to formula (309), as the correction data pertaining to the X-axis sensitivity correction coefficient a11 is in principle 1 with a11/a11=1, it is possible to conduct correction processing without impediment even if this correction data is not stored in the fuse memory.

Thus, with this computation method A, correction computation is conducted, for example, by setting the fixed value "1", and replacing the X-axis sensitivity correction coefficient with "1." By this means, the number of items of correction data to be stored in the fuse memory is decreased by one, and the total quantity of correction data is reduced. If the data length of each piece of correction data is a value of 6-bit length, whereas the total data length of correction coefficients a11, a12, a21 and a22 was 24 bits, the total quantity of the correction data D1, D2 and D3 pertaining to computation method A would be 18 bits.

(Computation Method B)

This computation method focuses on the fact that a12/a11 and a21/a11, which divide an interaxial correction coefficient by an axial sensitivity correction coefficient, are values close to "0," and correction processing is conducted using formula (310) obtained by setting, for example, a fixed value "0," and replacing the values of a12/a11 and a21/a11 by the fixed value.

(Number 3)

$$\begin{bmatrix} Sx' \\ Sy' \end{bmatrix} = \begin{bmatrix} 1 & 0 \\ 0 & D_3 \end{bmatrix} \begin{bmatrix} Sx \\ Sy \end{bmatrix} \quad (310)$$

With this computation method, the required number of items of correction data is decreased to one, with the result that the total quantity of correction data can be reduced to the 6 bits of 1 piece of correction data.

(Computation Method C)

With this computation method, correction processing is conducted using formula (311).

(Number 4)

$$\begin{bmatrix} Sx' \\ Sy' \end{bmatrix} = \begin{bmatrix} 1 & D_1 \\ D_2 & D_4 + 1 \end{bmatrix} \begin{bmatrix} Sx \\ Sy \end{bmatrix} \quad (311)$$

With this computation method, one focuses on the fact that that a22/a11, which divides an axial sensitivity correction coefficient by an axial sensitivity correction coefficient, is a value close to "1," and one strives to shorten the data length of the correction data by setting, for example, a standard value "1," and by adopting the differential of this standard value and a22/a11 as correction data.

That is, as the probability is high that the correction data D1 and D2 are small values to begin with, and as the probability is high that D4 is also a small value given that it is the differential with the standard value "1," it is possible to shorten the respective data lengths. If the bit length of each correction data is here shortened from 6 bits to 4 bits, the data quantity to be stored in the fuse memory is reduced to a total of 12 bits for the correction data D1, D2 and D4.

(Computation Method D)

This computation method D focuses on the fact that a12/a11 and a21/a11, which divide an interaxial correction coefficient by an axial sensitivity correction coefficient, are values close to "0," and correction processing is conducted using formula (312). The total quantity of correction data is reduced by adopting both the correction data item reduction explained with computation method B and the shortening of data length of the correction data explained with computation method C.

In brief, as with computation method B, the values of a12/a11 and a21/a11 are replaced by a fixed value (for example, "0"), and as with computation method C, the differential with the standard value (for example, "1") of a22/a11 is adopted as correction data.

(Number 5)

$$\begin{bmatrix} Sx' \\ Sy' \end{bmatrix} = \begin{bmatrix} 1 & 0 \\ 0 & D_4 + 1 \end{bmatrix} \begin{bmatrix} Sx \\ Sy \end{bmatrix} \quad (312)$$

With this computation method, the number of items of correction data can be decreased to one item as with method B, and the data length can also be shortened to, for example, 4 bits as with method C. In short, the total length of the correction data can be reduced to the 4 bits which is the data length of correction data D4.

Next, an explanation is made regarding the second embodiment of this invention. This second embodiment shows an example of application of 3 orthogonal axes to a geomagnetism detection device provided with a geomagnetic sensor. This geomagnetism detection device detects geomagnetism along 3 axes using an LSI with the same configuration as the LSI shown in FIG. 13.

The fuse memory of this device stores either the values of (e) D1-D3 and D5-D9 or (f) the values of D3 and D9, (g) the values of D4 and D1 and (h) the values of D1, D2, D4-D8 and D10 as the correction data for the detection outputs measured at the time of shipment inspection.

The correction data D5-D10 is shown in formulas (313)-(318).

$$D5 = a13/a11 \quad (313)$$

$$D6 = a23/a11 \quad (314)$$

$$D7 = a31/a11 \quad (315)$$

$$D8 = a32/a11 \quad (316)$$

$$D9 = a33/a11 \quad (317)$$

$$D10 = a33/a11 - 1 \quad (318)$$

Provided that aij (i=1 or 2, j=1 or 2) are the below-mentioned correction coefficients.

The magnetic detection outputs Sx, Sy and Sz and the magnetic fields Hx, Hy and Hz of the geomagnetic sensor have the relation shown in formula (319).

(Number 6)

$$\begin{bmatrix} Hx \\ Hy \\ Hz \end{bmatrix} = \begin{bmatrix} a11 & a12 & a13 \\ a21 & a22 & a23 \\ a31 & a32 & a33 \end{bmatrix} \begin{bmatrix} Sx \\ Sy \\ Sz \end{bmatrix} \quad (319)$$

Provided that aij (i=1 to 3, j=1 to 3) are correction coefficients, a11 is the X-axis sensitivity correction coefficient (=1/X axis sensitivity), a22 is the Y-axis sensitivity correction coefficient (=1/Y axis sensitivity), a33 is the Z-axis sensitivity correction coefficient (=1/Z axis sensitivity), a12, a13, a21, a23, a31 and a32 are interaxial correction coefficients.

In this second embodiment, correction processing is conducted based on any of the following correction computation methods E to H.

(Computation Method E)

With computation method E, correction computation is conducted using formula (320) from the standpoint that it is sufficient for geomagnetic sensor applications if the ratios for each component of the magnetic field are obtained, as with computation method A.

(Number 7)

$$\begin{bmatrix} Sx' \\ Sy' \\ Sz' \end{bmatrix} = \begin{bmatrix} 1 & D_1 & D_5 \\ D_2 & D_3 & D_6 \\ D_7 & D_8 & D_9 \end{bmatrix} \begin{bmatrix} Sx \\ Sy \\ Sz \end{bmatrix} \quad (320)$$

Provided that Sx', Sy' and Sz' are post-correction detection outputs.

If the data length of the correction coefficient is, for example, a value of 6-bit length, whereas a memory capacity of 54 bits would be necessary for purposes of storing the nine correction coefficients of a11 to a33, it is sufficient according to computation method E to store only the 8 pieces of correction data D1-D3 and D5-D9, with the result that required memory capacity can be reduced to 48 bits.

(Computation Method F)

With this computation method, as with computation method B, one focuses on the fact that a12/a11, a13/a11, a21/a11, a23/a11, a31/a11 and a32/a11 are value "0," and conducts correction processing using formula (321), substituting a fixed value (for example, "0") for a12/a11, a13/a11, a21/a11, a23/a11, a31/a11 and a32/a11.

(Number 8)

$$\begin{bmatrix} Sx' \\ Sy' \\ Sz' \end{bmatrix} = \begin{bmatrix} 1 & 0 & 0 \\ 0 & D_3 & 0 \\ 0 & 0 & D_9 \end{bmatrix} \begin{bmatrix} Sx \\ Sy \\ Sz \end{bmatrix} \quad (321)$$

With this computation method, as it is acceptable not to store in the fuse memory the correction data replaced by the fixed value "0," one can reduce the total quantity of correction data by this amount. That is, as it is acceptable to store only the correction data D3 and D9, the total quantity of required correction data D3 and D9 is reduced to 12 bits.

(Computation Method G)

With this computation method, one focuses on the fact that a22/a11 and a33/a11, which divide an axial sensitivity correction coefficient by an axial sensitivity correction coefficient, are values close to "1," and strives to shorten the data length of the correction data by expressing them as the differential with the standard value (in this example, "1"). That is, this computation method conducts correction processing using formula (322).

(Number 9)

$$\begin{bmatrix} Sx' \\ Sy' \\ Sz' \end{bmatrix} = \begin{bmatrix} 1 & D_1 & D_5 \\ D_2 & D_4 + 1 & D_6 \\ D_7 & D_8 & D_{10} + 1 \end{bmatrix} \begin{bmatrix} Sx \\ Sy \\ Sz \end{bmatrix} \quad (322)$$

It is acceptable to store the values of the correction data D1, D2, D4-D8 and D10 in the fuse memory. As the probability is high that these correction data values are all small values, their respective data lengths can be shortened to 4 bits. As a result, the total quantity of the 8 pieces of correction data D1, D2, D4-D8 and D10 can be reduced to 32 bits.

(Computation Method H)

With this computation method correction processing is conducted using formula (323).

(Number 10)

$$\begin{bmatrix} Sx' \\ Sy' \\ Sz' \end{bmatrix} = \begin{bmatrix} 1 & 0 & 0 \\ 0 & D_4 + 1 & 0 \\ 0 & 0 & D_{10} + 1 \end{bmatrix} \begin{bmatrix} Sx \\ Sy \\ Sz \end{bmatrix} \quad (323)$$

This computation method reduces the employed correction data to the two items D4 and D10 as explained by computation method F, and further makes D4 and D10 a differential value with the standard value (for example, "1")

to shorten data length to 4 bits. As a result, the total quantity of the correction data D4 and D10 to be stored is reduced to 8 bits.

An embodiment of this invention has been explained in detail above, but the specific configuration is not limited to this embodiment, and designs and the like are also included within a scope that does not deviate from the essentials of this invention.

For example, this invention is not limited to a mode that uses a fuse memory, and may adopt a mode that employs, for example, an anti-fuse memory, which is one type of nonvolatile memory element of the thermal metamorphic type.

Next, an application example is shown that installs the invention of this application in portable equipment such as a cell phone device.

Figure 15:
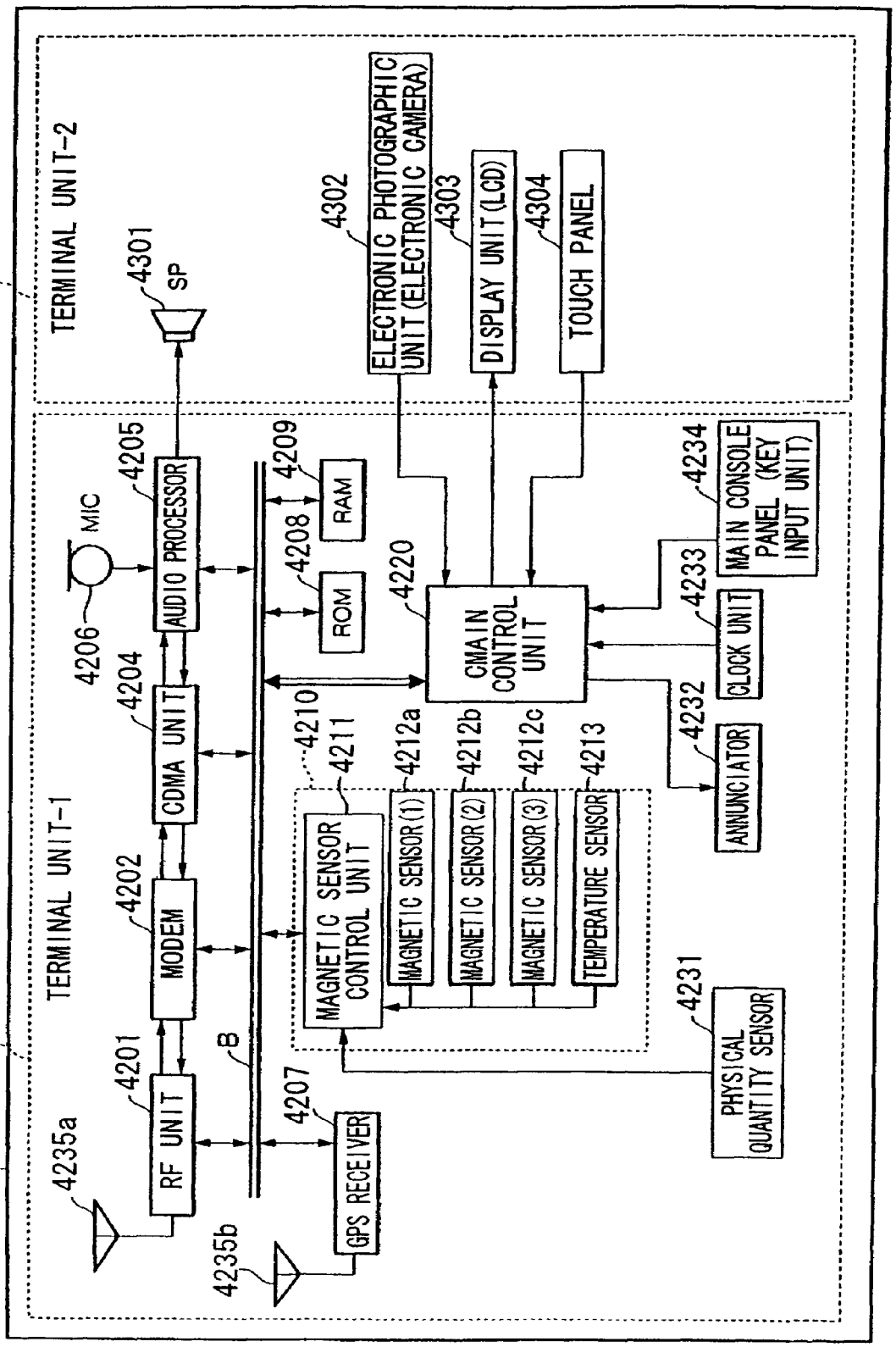
FIG. 15 is a block diagram that shows a schematic configuration in the case where the inventions of this application are incorporated into a cell phone device.

FIG. 15 is a block diagram showing the outline of a configuration of a cell phone device in the case where the invention of this application is installed in portable equipment such as a cell phone device. In addition to a magnetic sensor, the LSI 4210 for geomagnetism detection installed in the cell phone device 4100 of FIG. 15 is provided with a temperature sensor for conducting temperature compensation of the magnetic sensor.

In FIG. 15, the cell phone device 4100 has a configuration provided with the two casings of terminal unit 4200 and terminal unit 4300. The antenna 4235a is an antenna for conducting transmission and receipt of radio signals vis-à-vis a wireless station (not illustrated) for radio signals. The RF (radio frequency) unit 4201 converts the reception signals received by the antenna 4235a into reception signals of intermediate frequency, and outputs them to the modem 4202. Moreover, the RF unit 4201 modulates the transmission signals inputted from the modem 4202 to signals of a transmission frequency, and outputs them to the antenna 4235a for transmission.

The modem 4202 conducts demodulation processing of the reception signals inputted from the RF unit 4201, and conducts modulation processing of the transmission signals inputted from the CDMA (code division multiple access) unit 4204. The CDMA unit 4204 conducts encoding of the transmission signals, and decoding of the reception signals. The audio processor 4205 converts the audio signals inputted from the microphone 4206 into digital signals, and outputs them to the CDMA unit 4204. It also inputs digital audio signals from the CDMA unit, converts them to analog audio signals, outputs them to the speaker 4301, where they are enunciated. The GPS receiver 4207 demodulates the radio signals that the antenna 4235a receives from the GPS satellite, and calculates the position expressed by longitude, latitude or altitude and the like in its own 3-dimensional space based on the radio signals.

The physical quantity sensor 4231 detects the inclination of the portable terminal 4100. Moreover, the portable terminal 4100 does not have to be provided with the physical quantity sensor 4231. The LSI for geomagnetism detection 4210 is provided with the magnetic sensors 4212a-4212c for detecting magnetism (magnetic field) in the respective axial directions of the specified X axis, Y axis and Z axis which are mutually transverse, the temperature sensor 4213 for detecting temperature, and the magnetic sensor control unit 4211. The magnetic sensor control unit 4211 conducts processing such as analog/digital conversion relative to the detection results of the temperature sensor 4213 and physical quantity sensor 4231.

The main control unit 4220 is a CPU (central processing unit) for controlling the various parts of the portable terminal 4100. The ROM (read only memory) 4208 stores display image data and audio data, the programs executed by the main control unit 4220, the initial property values of the temperature sensor 4213 and physical quantity sensor 4231 measured at the time of shipment, etc. The RAM (random access memory) 4209 is a nonvolatile memory domain that temporarily stores computation data and the like used by the main control unit 4220.

The annunciator 4232 is provided with a speaker, vibrator and light-emitting diodes, and notifies the user of incoming transmissions, incoming mail and the like by sound, vibration and light. The clock unit 4233 is the clock function employed by the main control unit 4220. The main console panel 4234 outputs the instruction contents of the user to the main control unit 4220. The electronic photographic unit 4302 converts the image of the photographed object to digital signals, and outputs them to the main control unit 4220.

The display unit 4303 is a liquid crystal display for displaying images, text and the like based on the display signals inputted from the main control unit. The touch panel 4304 is built into the surface of the liquid crystal display of the display unit 4303, and outputs signals expressing the manipulations from the finger pressure of the user to the main control unit 4220.

The LSI for geomagnetism detection pertaining to the invention of this application adopts the mode of measuring the correction data at the time of shipment inspection, and writing it into a nonvolatile memory mounted in the LSI, but as the LSI for geomagnetism detection pertaining to the invention of this application is installed in a portable device, it is also possible to adopt the mode where the writing of the correction data is conducted, not at the time of shipment of the LSI for geomagnetism detection, but rather at the time when the LSI for geomagnetism detection is installed in the portable device, and this portable device undergoes shipment inspection.

After the correction data measured during inspection at the time of shipment of the LSI for geomagnetism detection is written into the internal fuse memory of the LSI, and further after installation of the geomagnetic sensor LSI in the portable device, it is also possible to write the correction data of the geomagnetic sensor LSI that was measured again at the time of shipment inspection of the portable device into the memory of the portable device (for example, ROM 4208 in FIG. 15). Thereafter, when geomagnetism is detected, it is also acceptable to apply not only the output results of the geomagnetic sensor LSI, but also other correction values (for example, correction values based on the output results of the temperature sensor and physical quantity sensor of FIG. 15).

INDUSTRIAL APPLICABILITY

The invention of this application may be applied to portable communication terminals such as cell phone devices possessing functions for conducting directional measurement.

The invention claimed is:

1. A geomagnetism detection device comprising a geomagnetism detection element for detecting transverse axial components of geomagnetism and a nonvolatile memory element of a thermal metamorphic type for storing correction information of detection outputs of the pertinent geomagnetism detection element, wherein said correction information consists of axial sensitivity correction coefficients and interaxial correction coefficients as well as values expressed as ratios relative to an axial sensitivity correction coefficient of either axis.

2. A geomagnetism detection device according to claim 1, wherein said nonvolatile memory element stores a minimum amount of correction information pertaining to axial sensitivity correction coefficients other than said axial sensitivity correction coefficient of either axis.

3. A geomagnetism detection device according to claim 2, which uses a differential value obtained by subtracting a preset standard value from a ratio of the pertinent axial sensitivity correction coefficient relative to an axial sensitivity correction coefficient, as correction information pertaining to an axial sensitivity correction coefficient other than said axial sensitivity correction coefficient of either axis.

4. A geomagnetism detection device according to claim 3 provided with a correction computation circuit for conducting correction computation of the detection output of said geomagnetism detection element, wherein this correction computation circuit multiplies the axial sensitivity correction coefficient by the detection output to conduct correction, and adds to it a correction term obtained by multiplying the axial sensitivity correction coefficient by the detection output of the other axis.

5. A geomagnetism detection device according to claim 2 provided with a correction computation circuit for conducting correction computation of the detection output of said geomagnetism detection element, wherein this correction computation circuit multiplies the axial sensitivity correction coefficient by the detection output to conduct correction, and adds to it a correction term obtained by multiplying the axial sensitivity correction coefficient by the detection output of the other axis.

6. A geomagnetism detection device according to claim 1 provided with a correction computation circuit for conducting correction computation of the detection output of said geomagnetism detection element, wherein this correction computation circuit multiplies the axial sensitivity correction coefficient by the detection output to conduct correction, and adds to it a correction term obtained by multiplying the axial sensitivity correction coefficient by the detection output of the other axis.

7. A geomagnetism detection device according to claim 6 provided with a correction computation circuit for conducting correction computation of the detection outputs of said geomagnetism detection element, wherein this correction computation circuit conducts correction computation after adding said standard value to said differential value, and restoring the axial sensitivity correction coefficient.

8. A geomagnetism detection device according to claim 7, wherein said correction computation circuit conducts computation by substituting a preset alternate value for correction coefficients that are unobtainable from said correction data.

9. A geomagnetism detection device according to claim 6, wherein said correction computation circuit conducts computation by substituting a preset alternate value for correction coefficients that are unobtainable from said correction data.

10. A geomagnetism detection device comprising:
a geomagnetism detection element for detecting geomagnetism of each transverse axial component; and
a nonvolatile memory element of a thermal metamorphic type for storing one piece or a plurality of pieces of correction data for correcting said detected geomagnetism values,
wherein each piece of said correction data is expressed as a value of a ratio of an interaxial correction coefficient to an axial sensitivity correction coefficient of either axis.

11. A geomagnetism detection device according to claim 10, wherein at least one piece of said correction data is a value of the ratio of an axial sensitivity correction coefficient other than one pertaining to said either axis relative to the axial sensitivity correction coefficient of said either axis.

12. A geomagnetism detection device according to claim 10, wherein at least one piece of said correction data is a value of the ratio of a differential value obtained by subtracting a prescribed standard value from an axial sensitivity correction coefficient pertaining to other than either of said axes, relative to said axial sensitivity correction coefficient of either axis.

13. A geomagnetism detection device according to claim 10 provided with a correction computation circuit for correcting the values of geomagnetism for each transverse axial component detected by said geomagnetism detection element,
wherein said correction computation circuit obtains a corrected geomagnetism value by computing the sum of a multiplication value obtained by multiplying the geomagnetism value of a specified axial component by an addition value obtained by adding a prescribed value to the ratio of the axial sensitivity correction coefficient of said specified axial component, or of a differential value obtained by subtracting a prescribed standard value from the axial sensitivity correction coefficient of said specified axial component, relative to said axial sensitivity correction coefficient of either axis, and a multiplication value obtained by multiplying the geomagnetism value of the other axial component by the value of the ratio of said interaxial correction coefficient relative to the axial sensitivity correction coefficient of either of said axial components.

14. A geomagnetism detection device according to claim 10 provided with a correction computation circuit for correcting the values of geomagnetism for each transverse axial component detected by said geomagnetism detection element,
wherein said correction computation circuit obtains a corrected geomagnetism value by calculating a multiplication value obtained by multiplying the geomagnetism value of a specified axial component by an addition value obtained by adding a prescribed value to the ratio of the axial sensitivity correction coefficient of said specified axial component, or of a differential value obtained by subtracting a prescribed standard value from the axial sensitivity correction coefficient of said specified axial component, relative to said axial sensitivity correction coefficient of either axis.

15. A geomagnetism detection device according to claim 10, wherein said nonvolatile memory element of the thermal metamorphic type is a fuse memory.

16. A geomagnetism detection device according to claim 10, wherein said prescribed standard value is said axial sensitivity correction coefficient of either axis.

17. The geomagnetism detection device according to claim 10, wherein each piece of said correction data is further expressed as a value of a ratio of an axial sensitivity correction coefficient to an axial sensitivity correction coefficient of either axis.

18. The geomagnetism detection device according to claim 10, wherein each piece of said correction data is further expressed as a value of a ratio of a differential value obtained by subtracting a preset standard value from an axial sensitivity correction coefficient to an axial sensitivity correction coefficient of either axis.

* * * * *

UNITED STATES PATENT AND TRADEMARK OFFICE
CERTIFICATE OF CORRECTION

PATENT NO. : 7,346,466 B2
APPLICATION NO. : 11/698156
DATED : March 18, 2008
INVENTOR(S) : Hideki Sato It is certified that error appears in the above-identified patent and that said Letters Patent is hereby corrected as shown below:

On the Title Page, item (30) should read
-- (30)  Foreign Application Priority Data October 7, 2004    (JP) ........................ 2004-295139
   October 12, 2004   (JP) ........................ 2004-297981
   March 30, 2005    (JP) ........................ 2005-099092 --.

Signed and Sealed this

Twelfth Day of August, 2008

JON W. DUDAS
*Director of the United States Patent and Trademark Office*